(12) United States Patent
Carrigan et al.

(10) Patent No.: US 11,363,382 B2
(45) Date of Patent: Jun. 14, 2022

(54) METHODS AND USER INTERFACES FOR AUDIO SYNCHRONIZATION

(71) Applicant: Apple Inc., Cupertino, CA (US)

(72) Inventors: Taylor G. Carrigan, San Francisco, CA (US); Joseph Labarck, Cupertino, CA (US); Christopher John Sanders, San Jose, CA (US); Jarrad A. Stallone, Pacifica, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/667,684

(22) Filed: Oct. 29, 2019

(65) Prior Publication Data

US 2020/0382872 A1 Dec. 3, 2020

Related U.S. Application Data

(60) Provisional application No. 62/855,911, filed on May 31, 2019.

(51) Int. Cl.
*H04R 5/04* (2006.01)
*G10L 19/16* (2013.01)

(52) U.S. Cl.
CPC .............. *H04R 5/04* (2013.01); *G10L 19/167* (2013.01); *H04R 2430/03* (2013.01)

(58) Field of Classification Search
CPC ........... H04N 21/4307; H04N 21/4305; H04N 21/43615; H04R 2227/005; H04R 5/04;
(Continued)

(56) References Cited

U.S. PATENT DOCUMENTS 6,323,846 B1 11/2001 Westerman et al.
6,570,557 B1 5/2003 Westerman et al.
(Continued)

FOREIGN PATENT DOCUMENTS

CN 108108146 A 6/2018
EP 1705883 A1 9/2006
(Continued)

OTHER PUBLICATIONS

Advisory Action received for U.S. Appl. No. 14/863,099, dated Sep. 8, 2016, 3 pages.
(Continued)

*Primary Examiner* — William C Vaughn, Jr.
*Assistant Examiner* — Naod W Belai
(74) *Attorney, Agent, or Firm* — Kubota & Basol LLP

(57) ABSTRACT

The present disclosure generally relates to audio synchronization. An example method includes, at a first device with a communication device: performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

51 Claims, 22 Drawing Sheets

(58) Field of Classification Search
CPC ... H04R 2227/003; H04R 5/02; G10L 19/167; G06F 3/165
See application file for complete search history.

(56) References Cited

U.S. PATENT DOCUMENTS

| | | | |
|---|---|---|---|
| 6,677,932 B1 | 1/2004 | Westerman | |
| 6,937,249 B2 | 8/2005 | Herbert et al. | |
| 7,614,008 B2 | 11/2009 | Ording | |
| 7,630,501 B2* | 12/2009 | Blank | H04S 7/301 381/300 |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,701,489 B1 | 4/2010 | Christie et al. | |
| 7,844,914 B2 | 11/2010 | Andre et al. | |
| 7,957,762 B2 | 6/2011 | Herz et al. | |
| 7,987,294 B2* | 7/2011 | Bryce | H04L 12/2809 709/248 |
| 8,006,002 B2 | 8/2011 | Kalayjian et al. | |
| 8,234,395 B2* | 7/2012 | Millington | G06F 3/04847 709/231 |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,483,853 B1* | 7/2013 | Lambourne | G05B 15/02 700/94 |
| 8,624,836 B1 | 1/2014 | Miller et al. | |
| 8,995,687 B2* | 3/2015 | Marino, Jr. | G06F 3/165 381/107 |
| 9,348,458 B2 | 5/2016 | Hotelling et al. | |
| 9,794,710 B1* | 10/2017 | Sheen | G06F 3/162 |
| 9,933,937 B2 | 4/2018 | Lemay et al. | |
| 10,097,942 B2* | 10/2018 | Griffiths | H04R 29/001 |
| 10,284,980 B1* | 5/2019 | Woo | H04N 21/44227 |
| 10,609,505 B1* | 3/2020 | Pires | H04R 3/12 |
| 10,911,748 B1 | 2/2021 | Molholm et al. | |
| 2001/0031622 A1 | 10/2001 | Kivela et al. | |
| 2002/0015024 A1 | 2/2002 | Westerman et al. | |
| 2002/0068600 A1 | 6/2002 | Chihara et al. | |
| 2002/0095508 A1 | 7/2002 | Okazawa | |
| 2002/0116172 A1 | 8/2002 | Vargas | |
| 2002/0128036 A1 | 9/2002 | Yach et al. | |
| 2002/0142734 A1 | 10/2002 | Wickstead | |
| 2003/0092395 A1 | 5/2003 | Gassho et al. | |
| 2003/0101340 A1 | 5/2003 | Sato | |
| 2003/0108039 A1 | 6/2003 | Shell et al. | |
| 2003/0120936 A1 | 6/2003 | Farris et al. | |
| 2003/0122806 A1 | 7/2003 | Edge | |
| 2003/0144009 A1 | 7/2003 | Nowlin | |
| 2003/0158917 A1 | 8/2003 | Andrew et al. | |
| 2004/0010569 A1 | 1/2004 | Thomas et al. | |
| 2004/0063464 A1 | 4/2004 | Akram et al. | |
| 2004/0151476 A1* | 8/2004 | Suzuki | H04S 7/301 386/239 |
| 2004/0203354 A1 | 10/2004 | Yue | |
| 2004/0220869 A1 | 11/2004 | Perera | |
| 2005/0097229 A1 | 5/2005 | Saito et al. | |
| 2005/0177256 A1* | 8/2005 | Shintani | H04R 27/00 700/94 |
| 2005/0190059 A1 | 9/2005 | Wehrenberg | |
| 2005/0210525 A1 | 9/2005 | Carle et al. | |
| 2005/0228638 A1 | 10/2005 | Muramatsu | |
| 2006/0017692 A1* | 1/2006 | Wehrenberg | G06F 1/1694 345/156 |
| 2006/0023246 A1 | 2/2006 | Vidyanand | |
| 2006/0033724 A1 | 2/2006 | Chaudhri et al. | |
| 2006/0101449 A1 | 5/2006 | Gatz | |
| 2006/0197753 A1 | 9/2006 | Hotelling | |
| 2006/0217104 A1 | 9/2006 | Cho | |
| 2006/0280360 A1 | 12/2006 | Holub | |
| 2006/0293877 A1 | 12/2006 | Soor | |
| 2007/0019815 A1* | 1/2007 | Asada | H04R 29/00 381/58 |
| 2007/0038999 A1* | 2/2007 | Millington | H04L 65/60 718/100 |
| 2007/0250597 A1 | 10/2007 | Resner et al. | |
| 2008/0007768 A1 | 1/2008 | Cho | |
| 2008/0048837 A1 | 2/2008 | Montgomery et al. | |
| 2008/0068139 A1 | 3/2008 | Jam et al. | |
| 2008/0070561 A1 | 3/2008 | Keum et al. | |
| 2008/0168245 A1 | 7/2008 | De atley et al. | |
| 2008/0259829 A1 | 10/2008 | Rosenblatt | |
| 2009/0060170 A1 | 3/2009 | Coughlan et al. | |
| 2009/0064038 A1 | 3/2009 | Fleischman et al. | |
| 2009/0195497 A1 | 8/2009 | Fitzgerald et al. | |
| 2009/0231960 A1 | 9/2009 | Hutcheson | |
| 2009/0300010 A1 | 12/2009 | Ratnakar | |
| 2009/0311993 A1 | 12/2009 | Horodezky | |
| 2010/0100838 A1 | 4/2010 | Vigesaa et al. | |
| 2010/0180017 A1 | 7/2010 | Goldstein | |
| 2011/0059769 A1 | 3/2011 | Brunolli | |
| 2011/0249015 A1 | 10/2011 | Lonkar | |
| 2012/0016927 A1 | 1/2012 | Leffert et al. | |
| 2012/0044062 A1 | 2/2012 | Jersa et al. | |
| 2012/0074851 A1 | 3/2012 | Erinjippurath | |
| 2012/0127324 A1 | 5/2012 | Dickins et al. | |
| 2012/0237037 A1* | 9/2012 | Ninan | H04S 7/304 381/17 |
| 2013/0027341 A1 | 1/2013 | Mastandrea | |
| 2013/0205208 A1 | 8/2013 | Kim et al. | |
| 2013/0207996 A1 | 8/2013 | Shibuya | |
| 2013/0222270 A1 | 8/2013 | Winkler et al. | |
| 2014/0177846 A1* | 6/2014 | Strub | G06F 3/0334 381/17 |
| 2014/0314250 A1* | 10/2014 | Park | G01S 5/30 381/92 |
| 2014/0323036 A1* | 10/2014 | Daley | H04H 60/88 455/3.06 |
| 2014/0328485 A1* | 11/2014 | Saulters | H04S 7/301 381/17 |
| 2015/0070337 A1 | 3/2015 | Bell et al. | |
| 2015/0100991 A1* | 4/2015 | Risberg | H04L 67/104 725/80 |
| 2015/0206468 A1 | 7/2015 | Wu | |
| 2015/0317928 A1 | 11/2015 | Safaee-rad et al. | |
| 2015/0317944 A1 | 11/2015 | Safaee-rad et al. | |
| 2015/0348502 A1 | 12/2015 | Marcu et al. | |
| 2015/0373083 A1 | 12/2015 | Geurts et al. | |
| 2016/0014266 A1 | 1/2016 | Bhatt | |
| 2016/0028869 A1 | 1/2016 | Bhatt | |
| 2016/0073210 A1* | 3/2016 | Sheen | H04R 29/001 381/59 |
| 2016/0227014 A1 | 8/2016 | Takagi | |
| 2016/0292376 A1 | 10/2016 | Sudo | |
| 2016/0316305 A1* | 10/2016 | Sheen | G06F 3/165 |
| 2017/0242653 A1* | 8/2017 | Lang | H04W 8/24 |
| 2017/0245079 A1* | 8/2017 | Sheen | H04R 9/046 |
| 2018/0335903 A1* | 11/2018 | Coffman | C08F 232/08 |
| 2019/0124458 A1 | 4/2019 | Sheen | |
| 2019/0191153 A1 | 6/2019 | Speigle et al. | |
| 2019/0327406 A1 | 10/2019 | Tokunaga | |
| 2020/0359487 A1 | 11/2020 | Tolen et al. | |
| 2021/0225322 A1 | 7/2021 | Ichihara et al. | |
| 2021/0358451 A1 | 11/2021 | Araki | |
| 2021/0382736 A1 | 12/2021 | Sanders et al. | |
| 2021/0383773 A1 | 12/2021 | Huss et al. | |

FOREIGN PATENT DOCUMENTS

| | | |
|---|---|---|
| WO | 2007/142703 A1 | 12/2007 |
| WO | 2007/149731 A1 | 12/2007 |
| WO | 2013/169849 A2 | 11/2013 |
| WO | 2014/105276 A1 | 7/2014 |

OTHER PUBLICATIONS

Decision on Appeal received for U.S. Appl. No. 14/774,664, mailed on Sep. 12, 2019, 8 pages.

(56) References Cited

OTHER PUBLICATIONS

Decision on Appeal received for U.S. Appl. No. 14/863,099, mailed on Aug. 22, 2019, 9 pages.
Examiner's Answer to Appeal Brief received for U.S. Appl. No. 11/850,020, mailed on Nov. 1, 2019, 7 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Final Office Action received for U.S. Appl. No. 11/850,020, dated Sep. 22, 2017, 19 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
Final Office Action received for U.S. Appl. No. 11/850,020, dated Jun. 4, 2014, 12 pages.
Final Office Action received for U.S. Appl. No. 11/850,020, dated Oct. 4, 2012, 10 pages.
Final Office Action received for U.S. Appl. No. 11/850,020, dated Dec. 14, 2018, 21 pages.
Final Office Action received for U.S. Appl. No. 11/850,020, dated Oct. 31, 2011, 12 pages.
Final Office Action received for U.S. Appl. No. 11/850,020, dated Sep. 24, 2015, 17 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Application Patent No. PCT/US2014/027882, dated Oct. 10, 2014, 11 pages.
Invitation to Pay Addition Fees received for PCT Patent Application No. PCT/US2014/027882, dated Aug. 5, 2014, 2 pages.
Non-Final Office Action received for U.S. Appl. No. 11/850,020, dated Jan. 12, 2017, 18 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Non-Final Office Action received for U.S. Appl. No. 11/850,020, dated Apr. 8, 2016, 14 pages.
Non-Final Office Action received for U.S. Appl. No. 11/850,020, dated Jun. 5, 2018, 26 pages.
Non-Final Office Action received for U.S. Appl. No. 11/850,020, dated Feb. 10, 2015, 11 pages.
Non-Final Office Action received for U.S. Appl. No. 11/850,020, dated Jun. 14, 2013, 8 pages.
Non-Final Office Action received for U.S. Appl. No. 11/850,020, dated Oct. 18, 2013, 11 pages.
Non-Final Office Action received for U.S. Appl. No. 11/850,020, dated Feb. 3, 2011, 8 pages.
Non-Final Office Action received for U.S. Appl. No. 11/850,020, dated May 30, 2012, 12 pages.
Dharmasena, Anusha, "iMessage-send as text message Option", YouTube, Available online at: <https://www.youtube.com/watch?v=hXG-MdlW6FA>, Feb. 18, 2013, 1 page.
International Search Report received for PCT Patent Application No. PCT/US2020/035477, dated Sep. 11, 2020, 3 pages.
Non-Final Office Action received for U.S. Appl. No. 17/341,121, dated Dec. 27, 2021, 30 pages.

* cited by examiner

METHODS AND USER INTERFACES FOR AUDIO SYNCHRONIZATION

CROSS REFERENCE TO RELATED APPLICATIONS

This application claims priority to U.S. provisional patent application 62/855,911, entitled "METHODS AND USER INTERFACES FOR AUDIO SYNCHRONIZATION," filed on May 31, 2019, the contents of which is hereby incorporated by reference in its entirety for all purposes.

FIELD

The present disclosure relates generally to computer user interfaces, and more specifically to techniques for audio synchronization.

BACKGROUND

Playback of media that includes audio, including movies, music, audiobooks, can be enhanced through the use of multiple output devices, which can provide more immersive audio.

SUMMARY

Output of audio via multiple devices can be improved by synchronizing audio output timings. Some techniques for audio synchronization using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for audio synchronization. Such methods and interfaces optionally complement or replace other methods for audio synchronization. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with at a first device with a communication device, performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

Example non-transitory computer-readable storage media are described herein. An example non-transitory computer-readable storage medium stores one or more programs configured to be executed by one or more processors of an electronic device with a communication device, the one or more programs including instructions for: performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

Example transitory computer-readable storage media are described herein. An example transitory computer-readable storage medium stores one or more programs configured to be executed by one or more processors of an electronic device with a communication device, the one or more programs including instructions for: performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

Example electronic devices are described herein. An example electronic device includes a communication device; one or more processors; and memory storing one or more programs configured to be executed by the one or more processors, the one or more programs including instructions for: performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

An example electronic device includes a communication device; and means for performing an audio timing synchronization process that includes: transmitting, via the communication device, to a second device, a request for the second device to participate in the audio timing synchronization process; subsequent to transmitting the request to the second device, causing an output of an audio tone; subsequent to causing the output of the audio tone, receiving data from the second device based on the audio tone; and adjusting an audio timing synchronization setting of a third device based at least in part on the data received from the second device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for audio synchronization, thereby increasing the effectiveness, efficiency, and user satisfaction with such devices. Such methods and interfaces may complement or replace other methods for audio synchronization.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
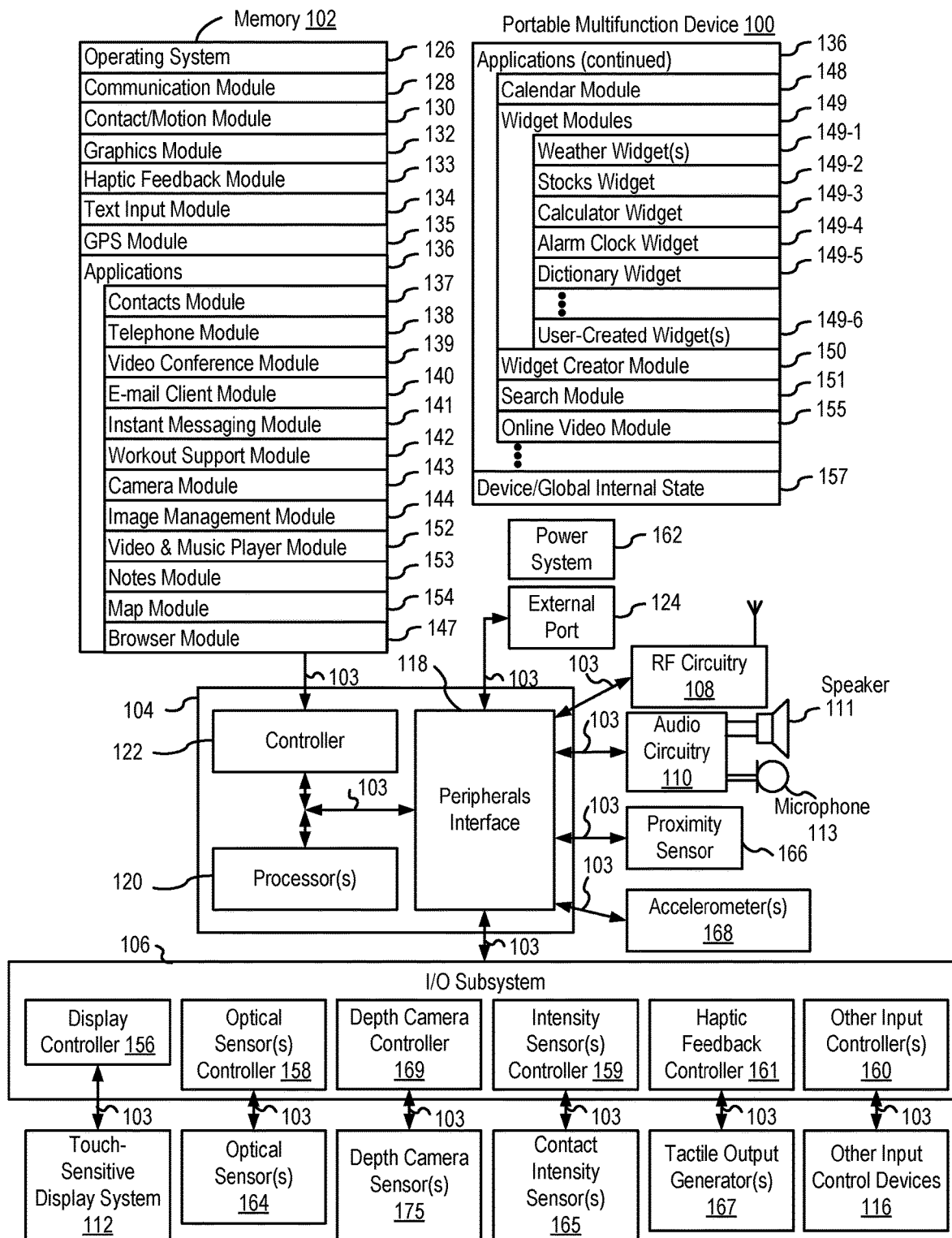
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for audio synchronization. Such techniques can reduce the cognitive burden on a user who performs audio synchronization, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6, 7A-7F, and 8A-8F illustrate exemplary user interfaces for performing an audio timing synchronization process, in accordance with some embodiments. FIG. 9 is a flow diagram illustrating methods for performing an audio timing synchronization process, in accordance with some embodiments. The exemplary arrangement of exemplary electronic devices in an exemplary home media system in FIG. 6 and the user interfaces in FIGS. 7A-7F and 8A-8F are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557

(Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
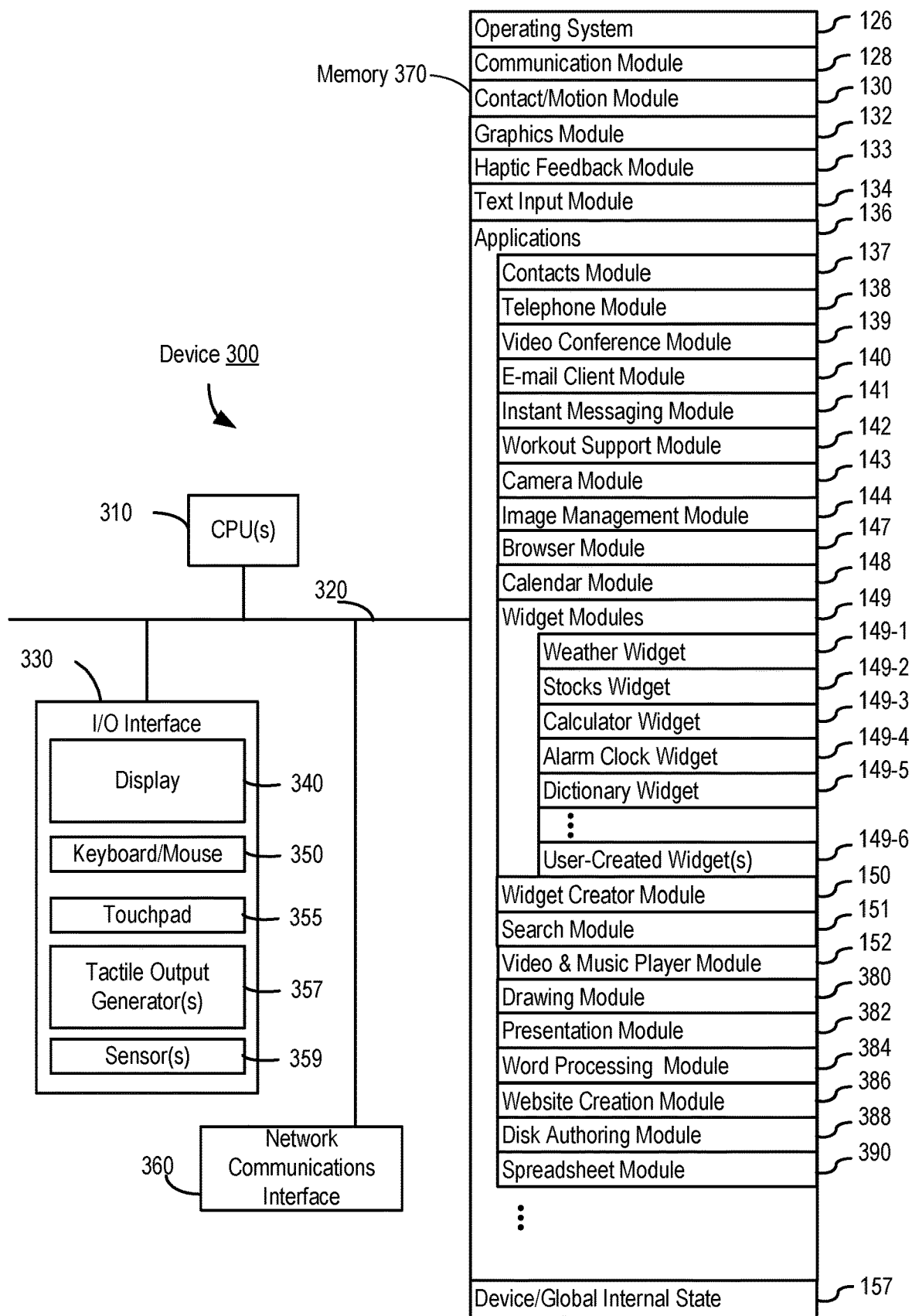
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
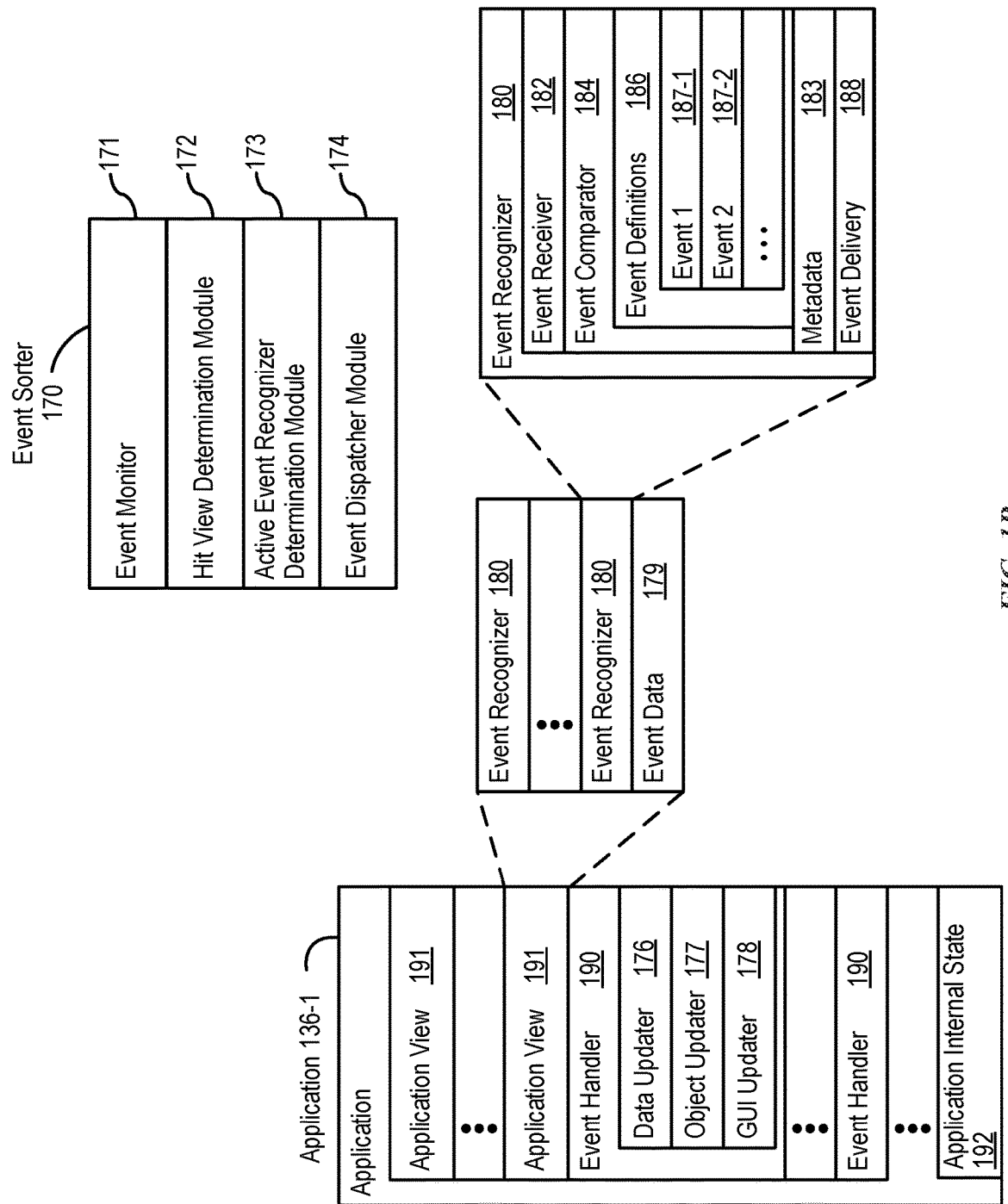
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates anew user-interface objector updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
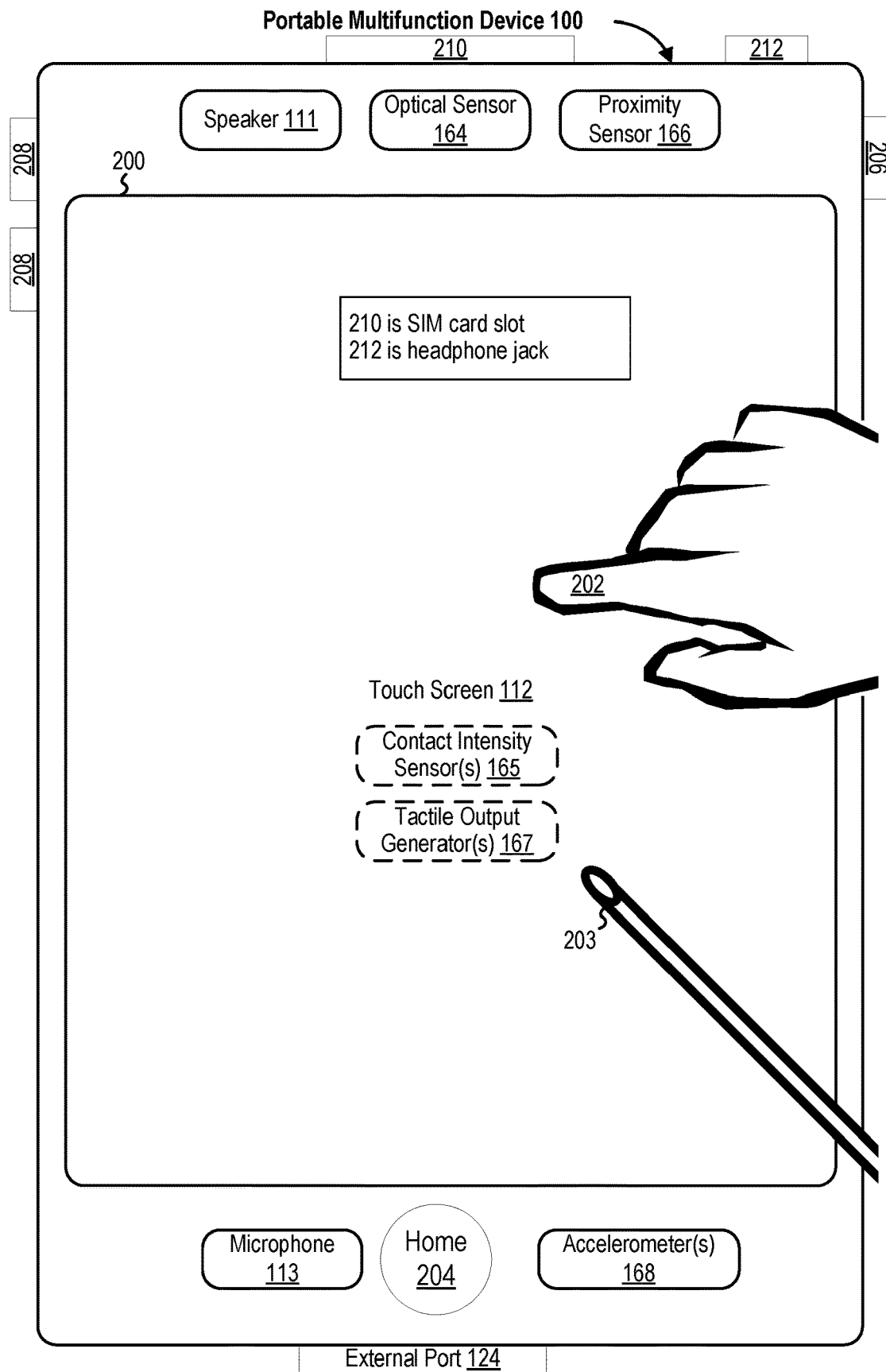
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
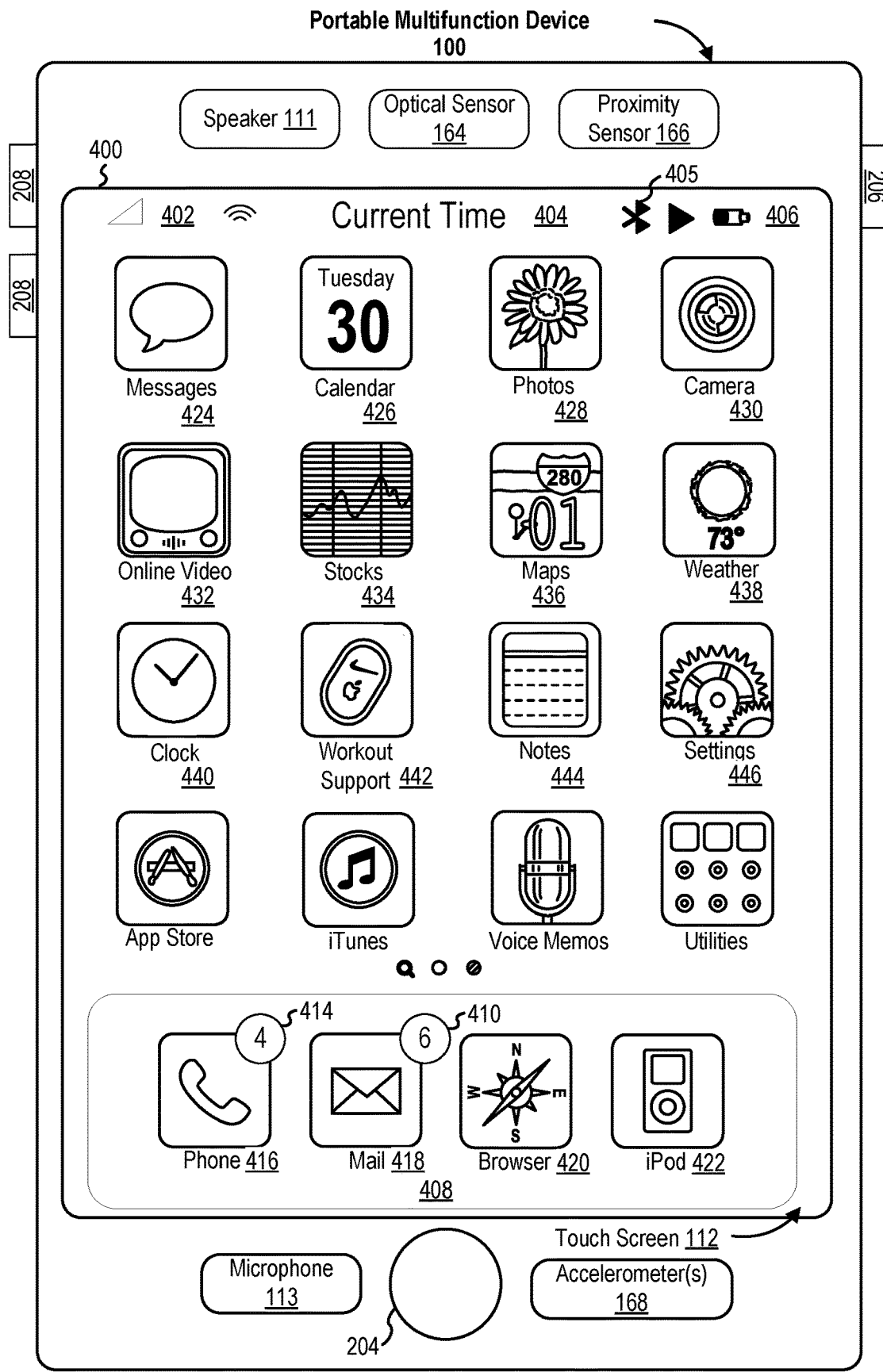
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
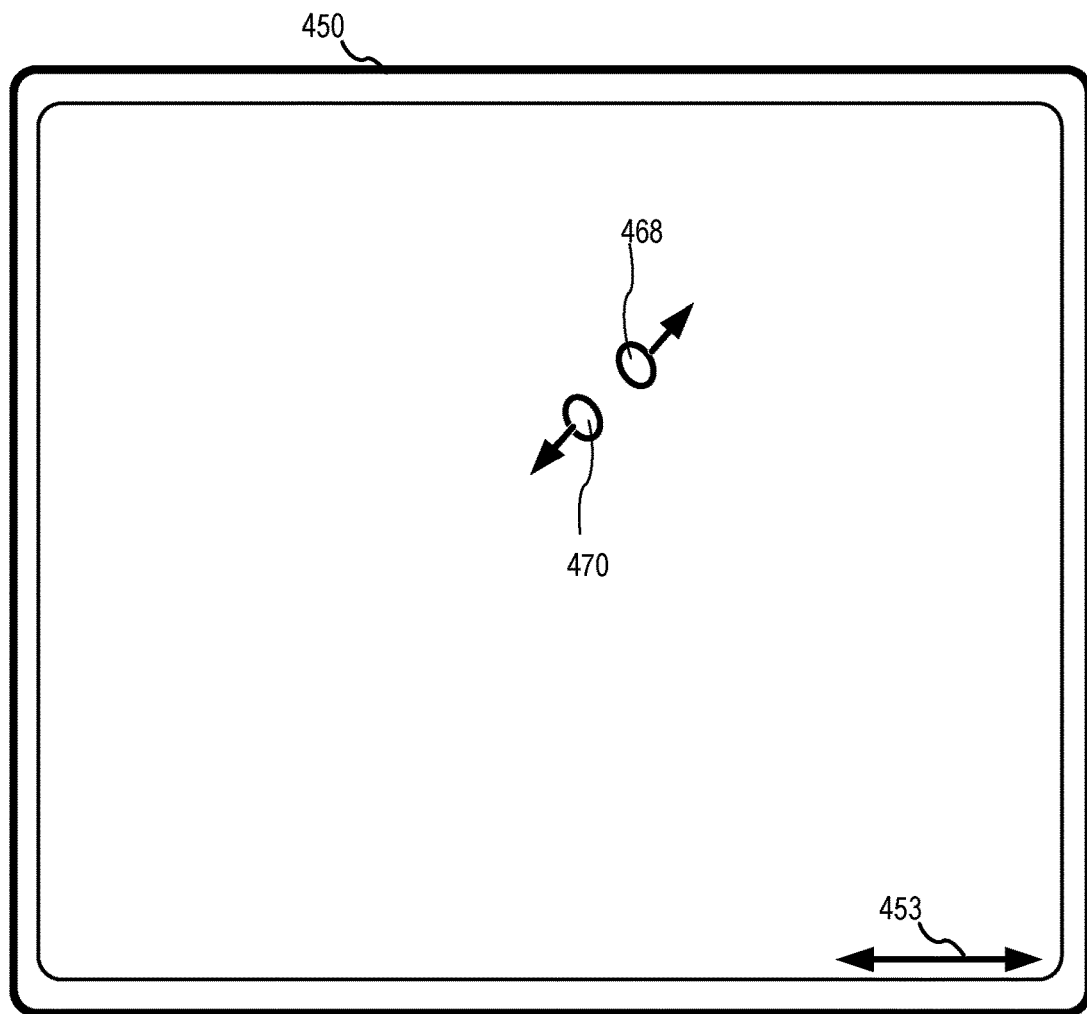
FIG. 4B illustrates an exemplary user interface for a multifunction device with a touch-sensitive surface that is separate from the display in accordance with some embodiments.
Figure 4B:
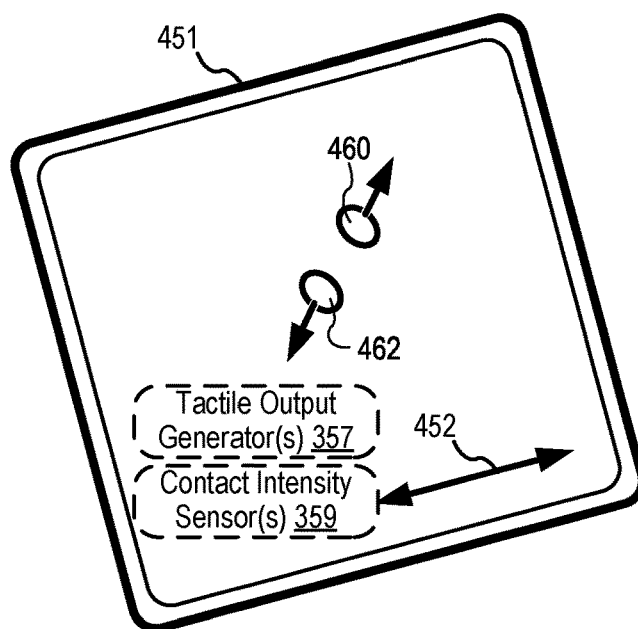

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
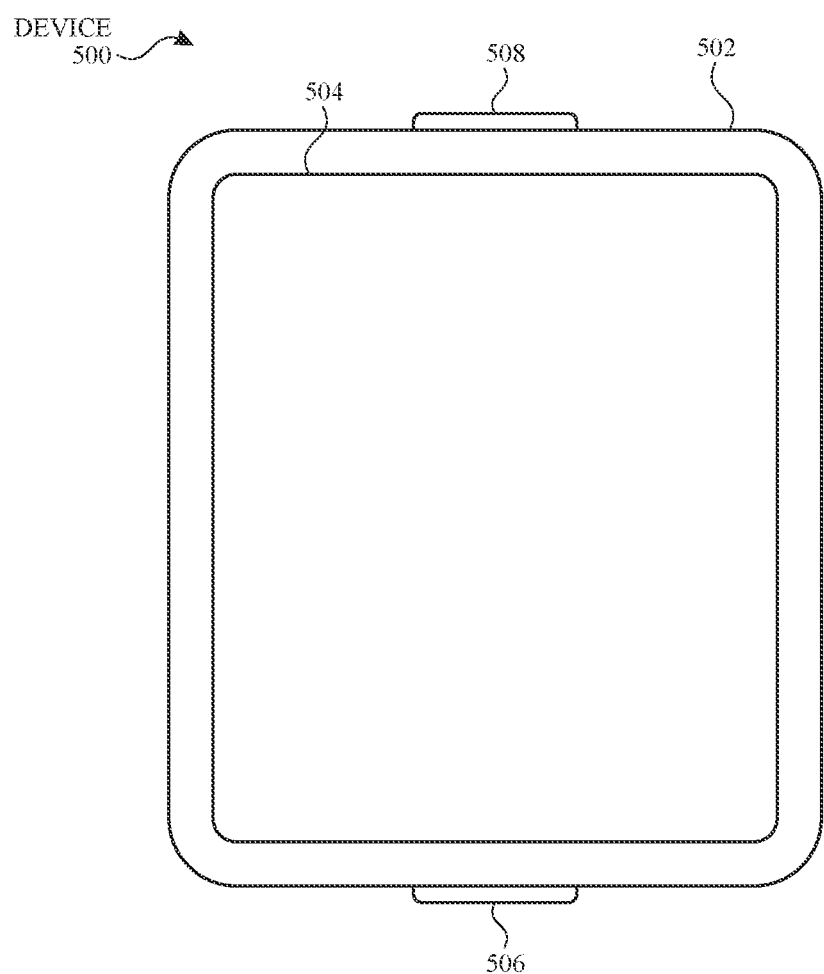
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
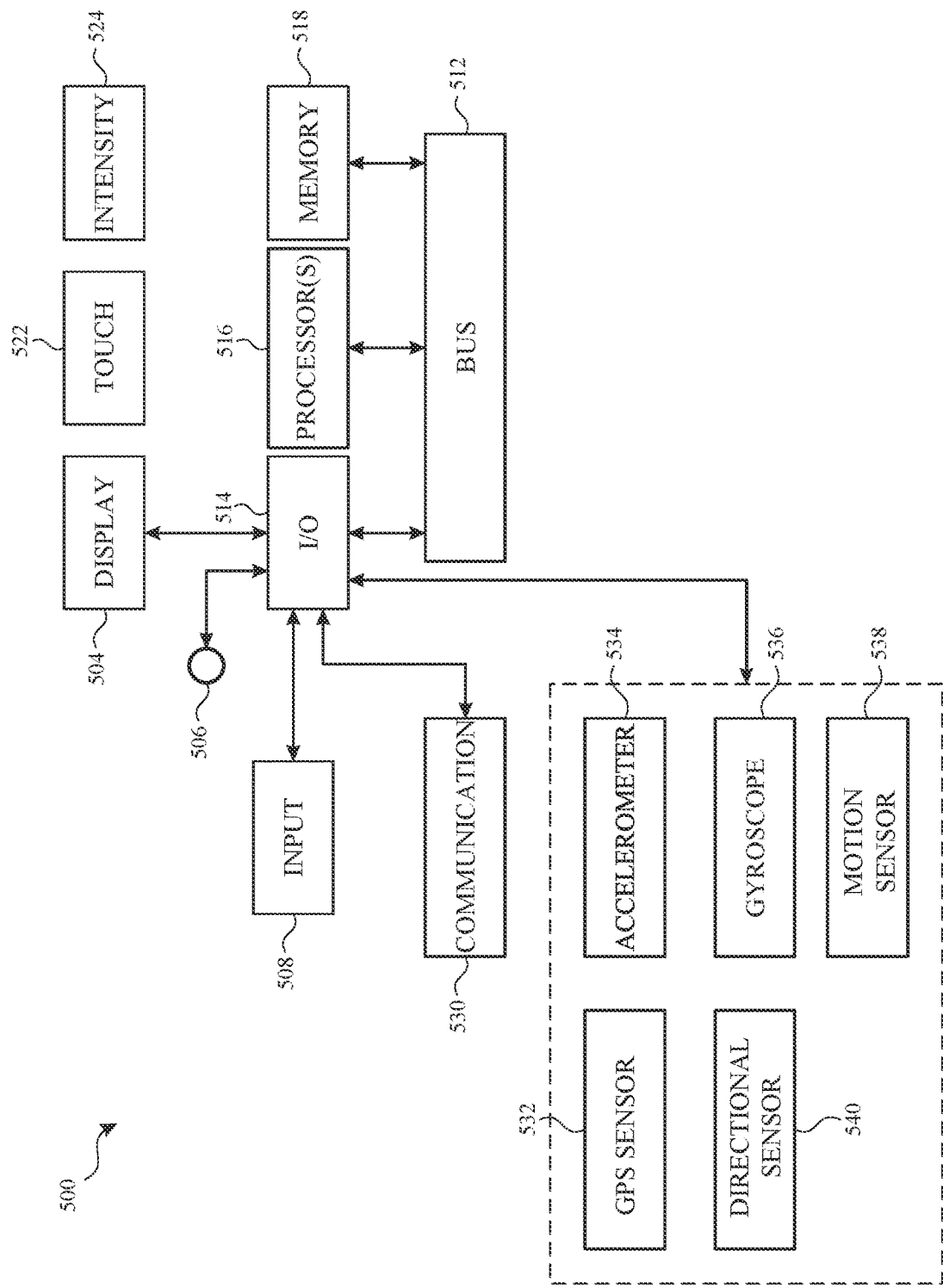
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6, 7A-7F, and 8A-8F illustrate exemplary user interfaces for performing an audio timing synchronization process, in accordance with some embodiments. The user interfaces in these figures are used to illustrate the processes described below, including the processes in FIG. 9.

Figure 6:
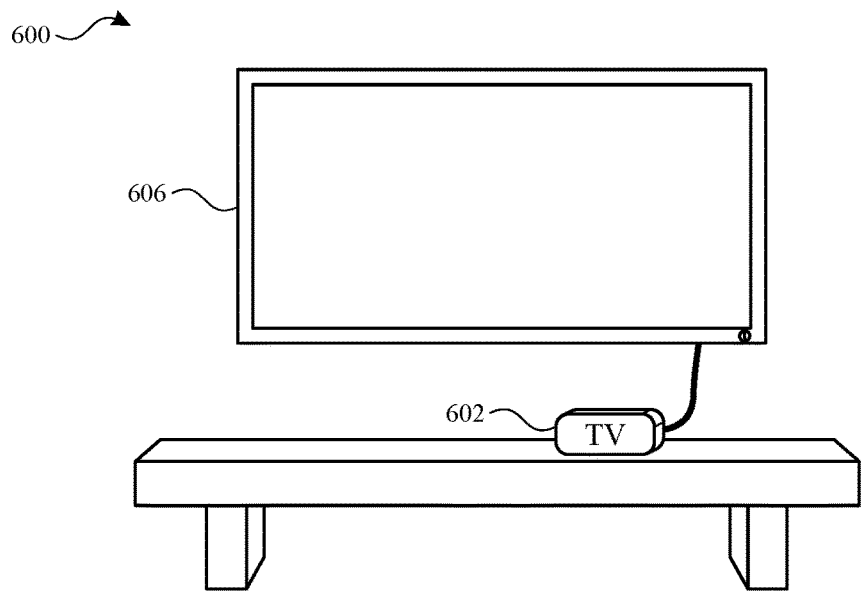
FIG. 6. Illustrates an exemplary arrangement of exemplary electronic devices in an exemplary home media system, in accordance with some embodiments.
Figure 6:
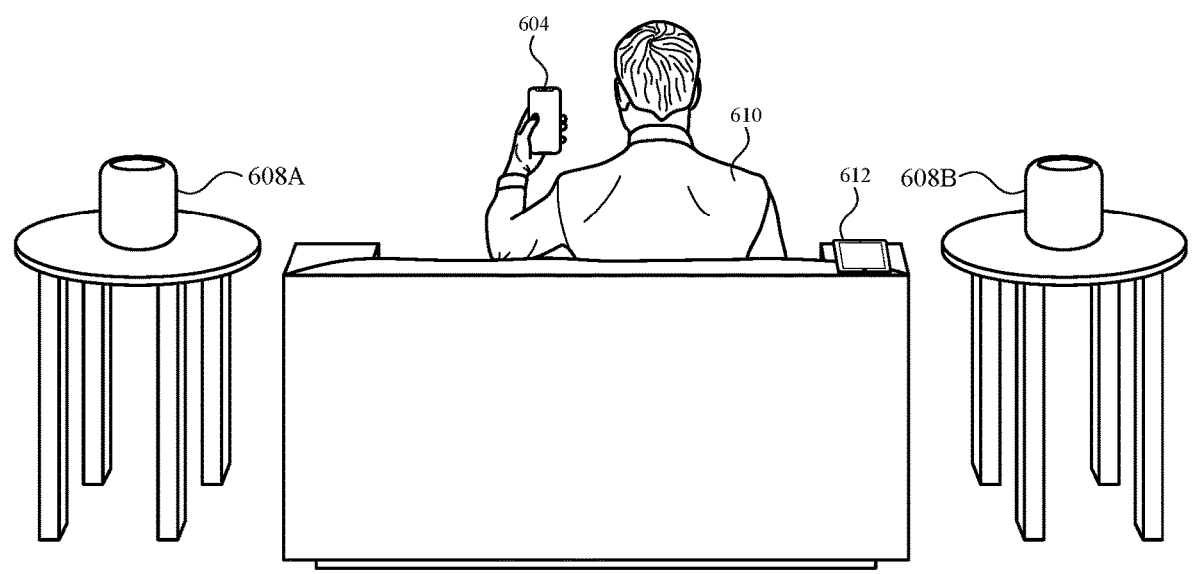

FIG. 6 illustrates an exemplary arrangement of exemplary electronic devices in an exemplary home media system 600. In some embodiments, a home media system (e.g., 600) includes one or more electronic devices (e.g., 602, 606, 608A, 608B). In this example, home media system 600 includes home media hub 602, display device 606 (e.g., a television), and audio output devices 608A-608B. In some embodiments, devices 602, 606, and 608 each include one or more features of devices 100, 300, 500, and 580.

As shown in FIG. 6, home media system 600 includes home media hub 602. In some embodiments, a home media hub (e.g., 602) is a device that includes one or more of the following features: media content (e.g., video and/or audio) storage, media content streaming (e.g., via a network connection), video output (e.g., via HDMI and/or other wired or wireless connection), audio output (e.g., via HDMI, an optical interface, and/or other wired or wireless connection), one or more display devices (e.g., screens), output to one or more external display devices (e.g., television), a user interface (e.g., graphical user interface), and support for user input and control via an external device (e.g., a remote control) (e.g., via infrared communication, Bluetooth communication, or the like). An example of a home media hub is an "Apple TV" device produced by Apple Inc. of Cupertino, Calif.

Exemplary home media system 600 also includes display device 606 (e.g., a television). In this example, display device 606 is connected to home media hub 602 (e.g., via HDMI), and home media hub 602 causes display of content (e.g., graphical user interfaces, media content) on display device 606 (e.g., because home media hub 602 does not include a display).

Exemplary home media system 600 also includes audio output devices 608A and 608B, which are smart speakers in this example. In some embodiments, an audio output device (e.g., 608A, 608B) is connected to one or more of: one or more home media hub (e.g., 602) (e.g., via HDMI, an optical interface, and/or other wired or wireless connection), one or more display device (e.g., 606) (e.g., via HDMI, an optical interface, and/or other wired or wireless connection), and one or more audio amplifier (e.g., when an audio output device is a normal speaker) (e.g., that is connected to one or more of 602 and 606 via HDMI, an optical interface, and/or other wired or a wireless connection). In this example, audio output devices 608A and 608B are connected to home media hub 602 via a wireless connection (e.g., Wi-Fi). Audio output devices 608A and 608B can be configured to output audio (e.g., music, dialogue, tones, etc.) of content (e.g., media, applications, etc.) in synchronization with each other, and with audio output by other devices (e.g., display device 606). For example, smart speakers 608A and 608B can be used as audio output devices that provide audio output of content at the direction of (e.g., being output by, received from) home media hub 602 and/or display device 606 (e.g., in addition to, or instead of, speakers of display device 606). For example, an interface of home media hub 602 can be used to select music or a movie for playback, and home media hub 602 can then cause audio output associated with the selected media content to be output at speakers of display device 606 as well as at audio output devices 608A and 608B (e.g., by transmitting data to those external devices 606, 608A, and 608B). Causing output of audio content (e.g., at an external device) can include one or more of: providing data representing the content (e.g., a stream of an audio track), and providing data where such content can be accessed (e.g., a location on a local area network, a location on a wide area network (e.g., an internet address of a music streaming service)). In such examples of coordinated content output among various devices, timing synchronization of the audio output between the various devices that are outputting audio is important, as even small differences in arrival times of audio output from different audio output sources at a listener's position are perceptible to a listener.

Also shown in FIG. 6 is a user 610, holding an exemplary electronic device, smartphone 604 and positioned at a listening position. In some embodiments, smartphone 604 includes one or more features of devices 100, 300, and 500. In this example, smartphone 604 includes a display device 604A, one or more microphones, and a communication device. Smartphone 604 is connected to home media hub 602 by virtue being connected to a common network (e.g., a home Wi-Fi network). Thus, home media hub 602 and smartphone 604 can communicate (e.g., exchange data) via the common network. FIG. 6 also includes a tablet computer 612 near user 610. In some embodiments, tablet computer 612 includes one or more features of devices 100, 300, and 500, including one or more microphones and a communication device.

Output of audio using a home media system (e.g., 600) can result in unintended and negative effects if the home media system has not been optimized. In one example, the use of different devices (e.g., 606, 608A, 608B) that use different respective connections (e.g., display device 606 has a wired connection to home media hub 602, audio output devices 608A and 608B have wireless connections to home media hub 602) can result in the audio output having different time delays between when an audio signal is outputted by a first device (e.g., home media hub 602) and when audio output arrives at a listener's location. As another example, a different distance between respective audio output devices and a listener can cause arrival of respective audio output from each of the audio output devices at a listener's position at different times (e.g., because audio output from the further audio output device needs to cover a greater distance to reach the listener). In such examples, the audio output from the respective audio output devices would sound (to the listener) to be out of synchronization with each other. In either one of the examples above, a user's (e.g., listener's) experience would be negatively affected. However, some techniques for optimizing a home media system can involve complicated interfaces, specialized equipment not readily available to a user, or are not supported at all. The techniques provided below with respect to FIGS. 7A-7F and 8A-8F illustrate effective and efficient processes for optimizing a home media system, in accordance with some embodiments.

In some embodiments, a home media system (e.g., 600) can include one or more of the devices other than those described above. In some embodiments, a home media system can include more than one of the devices described above. In some embodiments, a home media system can include fewer than one of the devices described above.

FIGS. 7A-7F illustrate exemplary interfaces for performing an audio timing synchronization process using a first device (e.g., home media hub 602). In the examples in FIGS. 7A-7F, home media hub 602 is connected to display device 606, audio output devices 608A-608B, and smartphone 604, as described above with respect to FIG. 6. For simplicity, home media hub 602 and audio output devices 608A-608B are not displayed in FIGS. 7A-7F. In FIGS. 7A-7F, home media hub 602 causes display, on display device 606, of the respective interfaces shown in each figure. Thus, in these examples display device 606 is used as an external display for displaying interfaces of home media hub 602. The user inputs described in FIGS. 7A-7F are received at either home media hub 602 or an external device (e.g., remote control) connected to home media hub 602.

Figure 7A:
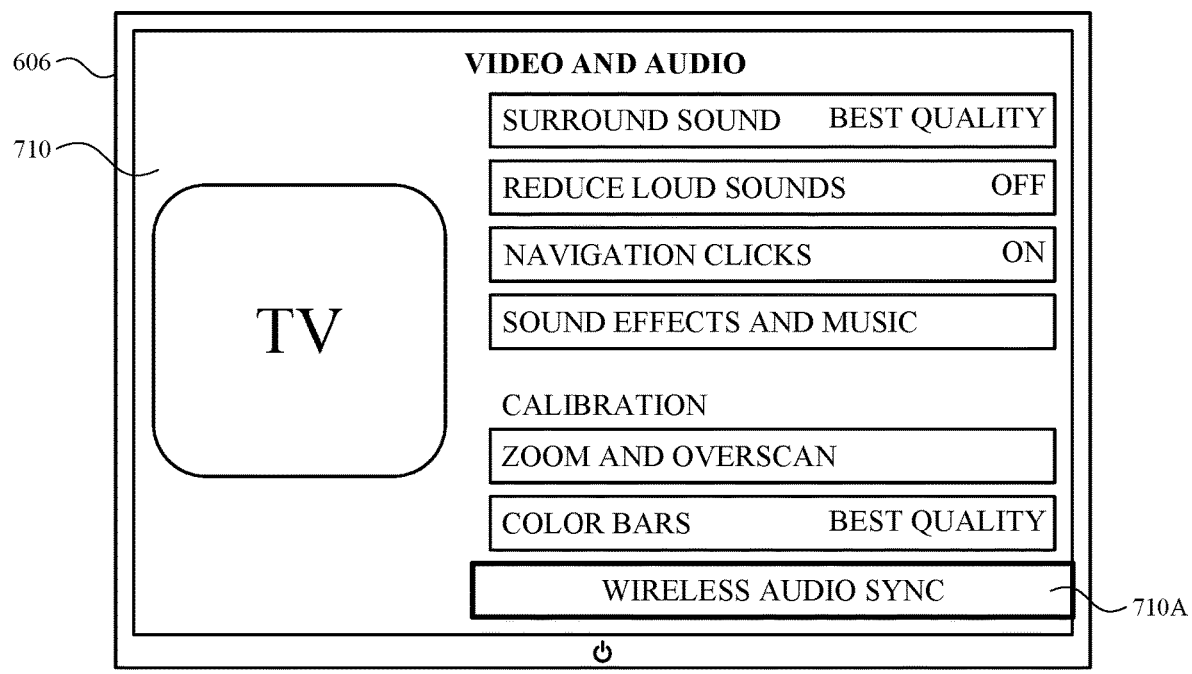
FIGS. 7A-7F illustrate exemplary user interfaces for performing an audio timing synchronization process, in accordance with some embodiments.

FIG. 7A illustrates an exemplary home media hub configuration menu interface 710. In this example, a user wishing to manually begin performing an audio timing synchronization process navigates to interface 710. Interface 710 includes a plurality of options for configuring and/or toggling settings (e.g., audio and video-related settings) associated with home media hub 602, including affordance 710A for initiating at least a portion of an audio timing synchronization process. At FIG. 7A, home media hub 602 receives user input representing a request to initiate an audio timing synchronization process. For example, home media hub 602 receives data representing user input selection (e.g., from a remote control) of menu affordance 710A (which includes the text "WIRELESS AUDIO SYNC"), which is shown highlighted for selection in FIG. 7A. In response to receiving the request to initiate an audio timing synchronization process, the device (e.g., 602) performs at least a portion of timing synchronization process (e.g., performs one of the actions described a below with respect to FIGS. 7B-7F).

In some embodiments, an audio timing synchronization process is performed automatically (e.g., in the background) without being started via user input (e.g., selection of affordance 710A). For example, an audio timing synchronization process can be performed during initial setup of home media hub 602 in a manner invisible to the user (e.g., no indicative interface is displayed, and/or no human-audible tone is output).

Figure 7B:
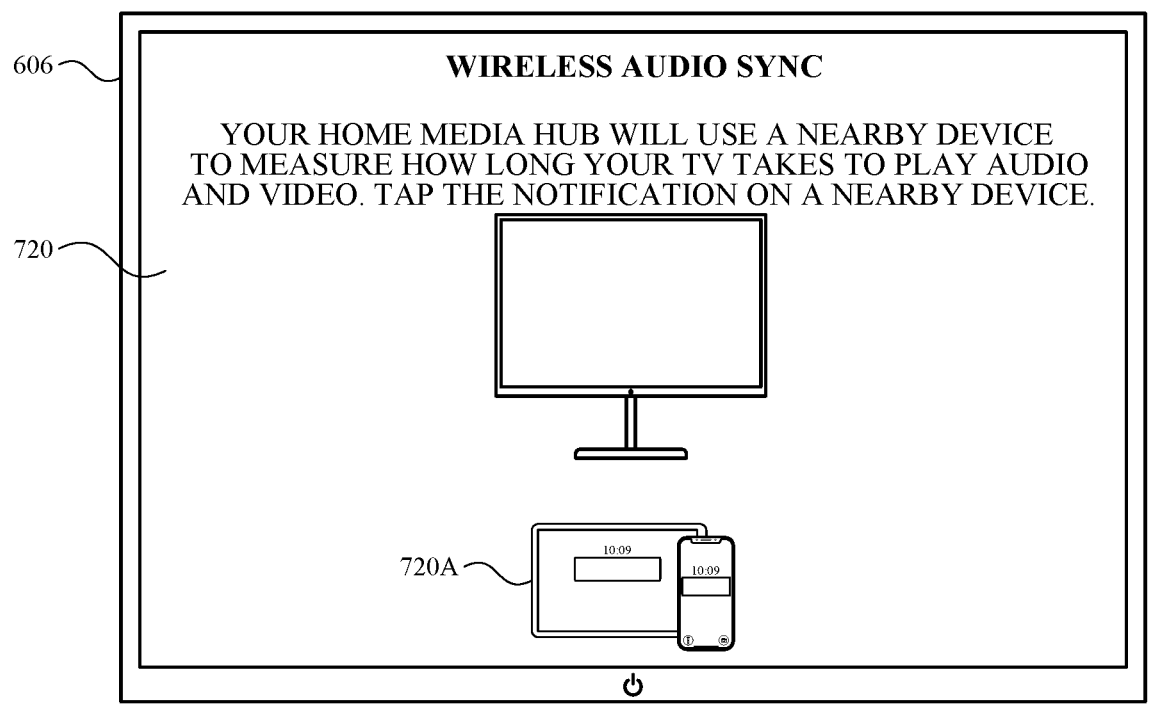
Figure 8A:
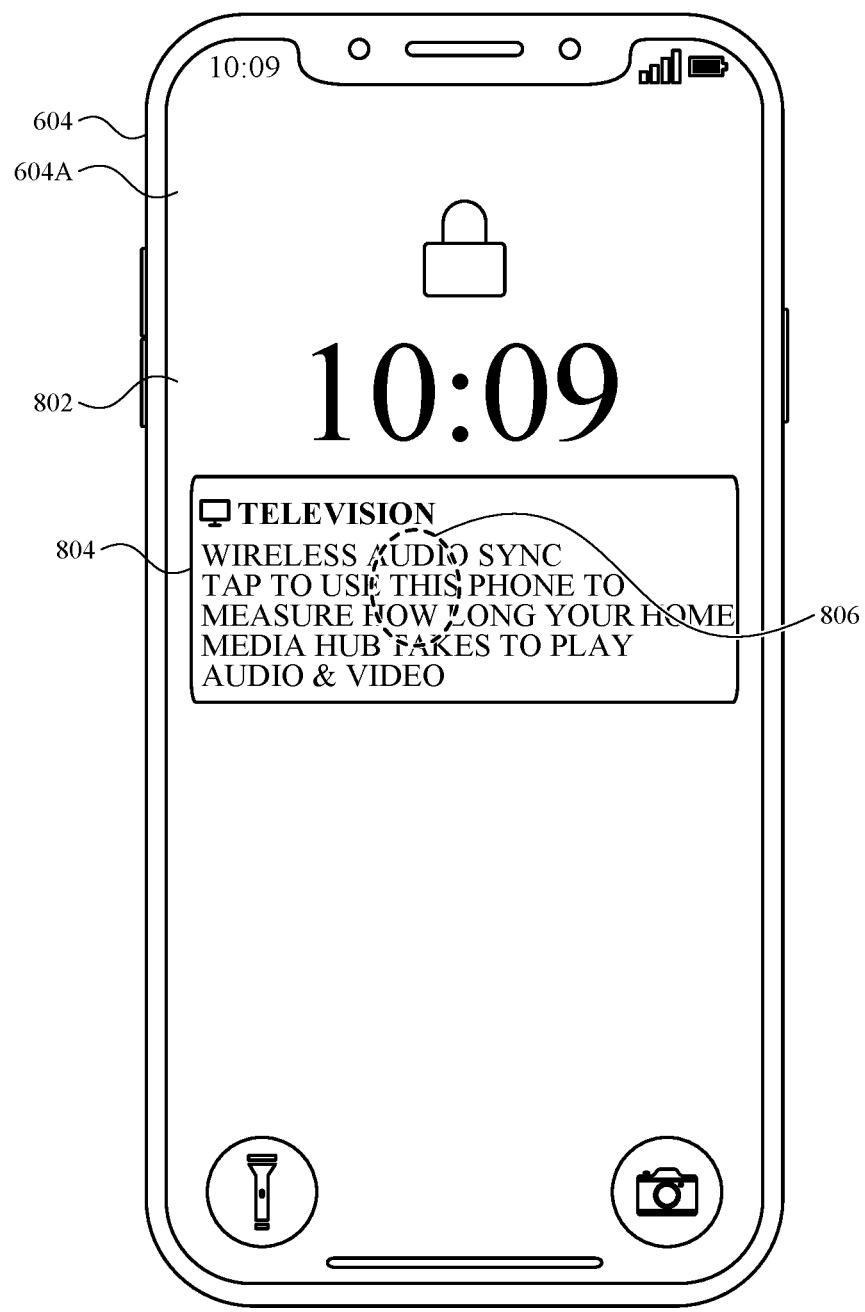
FIGS. 8A-8F illustrate exemplary user interfaces for performing an audio timing synchronization process, in accordance with some embodiments.

FIG. 7B illustrates audio timing synchronization process interface 720, optionally displayed while home media hub 602 performs an audio timing synchronization process. As shown, interface 720 includes the text "WIRELESS AUDIO SYNC" and "YOUR HOME MEDIA HUB WILL USE A NEARBY DEVICE TO MEASURE HOW LONG YOUR TV TAKES TO PLAY AUDIO AND VIDEO. TAP THE NOTIFICATION ON A NEARBY DEVICE". Thus, interface 720 provides instructions to a user regarding how to proceed with the audio timing synchronization process. In this example, a user input (e.g., a tap) at a second device (e.g., smartphone 604) is required to continue with the audio timing synchronization process. For example, while home media hub causes interface 720 to be displayed, smartphone 604 can display notification 804 awaiting a user input 806 (as shown in FIG. 8A, which is described in more detail below) before proceeding with the audio timing synchronization process.

In some embodiments, performing an audio timing synchronization process includes transmitting a request to one or more devices to participate in the audio timing synchronization process. For example, home media hub 602 transmits a request to smartphone 604 to participate in an audio timing synchronization process (e.g., the reception of which causes smartphone 604 to display notification 804 as shown in FIG. 8A). In this example, the request is transmitted in accordance with receiving selection of affordance 710A. In some embodiments, home media hub 602 also transmits a request to tablet computer 612 to participate in an audio timing synchronization process.

In some embodiments, performing an audio timing synchronization process includes causing display of one or more indications (e.g., 720A) of one or more devices that can participate in an audio timing synchronization process. For example, interface 720 includes an indicator 720A that depicts multiple devices (e.g., a tablet computer and a smartphone), indicating that any one of multiples devices can be used to perform the audio timing synchronization process. Home media hub 602 sends requests to a plurality of nearby devices (e.g., devices connected to the same network (e.g., Wi-Fi network) and/or within wireless range (e.g., Wi-Fi range, Bluetooth range)) to participate in an audio timing synchronization process.

Using a second device, such as smartphone 604, as part of an audio timing synchronization process can be beneficial. For one, the use of specialized equipment can be eliminated through the use of a user device this is readily capable of participating in an audio timing synchronization process— e.g., one that it includes one or more microphones and is connected to the home media hub 602. Moreover, a user is likely to be holding smartphone 604 in the same location for which the audio timing needs to be optimized (e.g., the normal listening position, as depicted by the position of user 610 in FIG. 6) (e.g., based on the distance from the position and the one or more audio output devices).

Figure 7C:
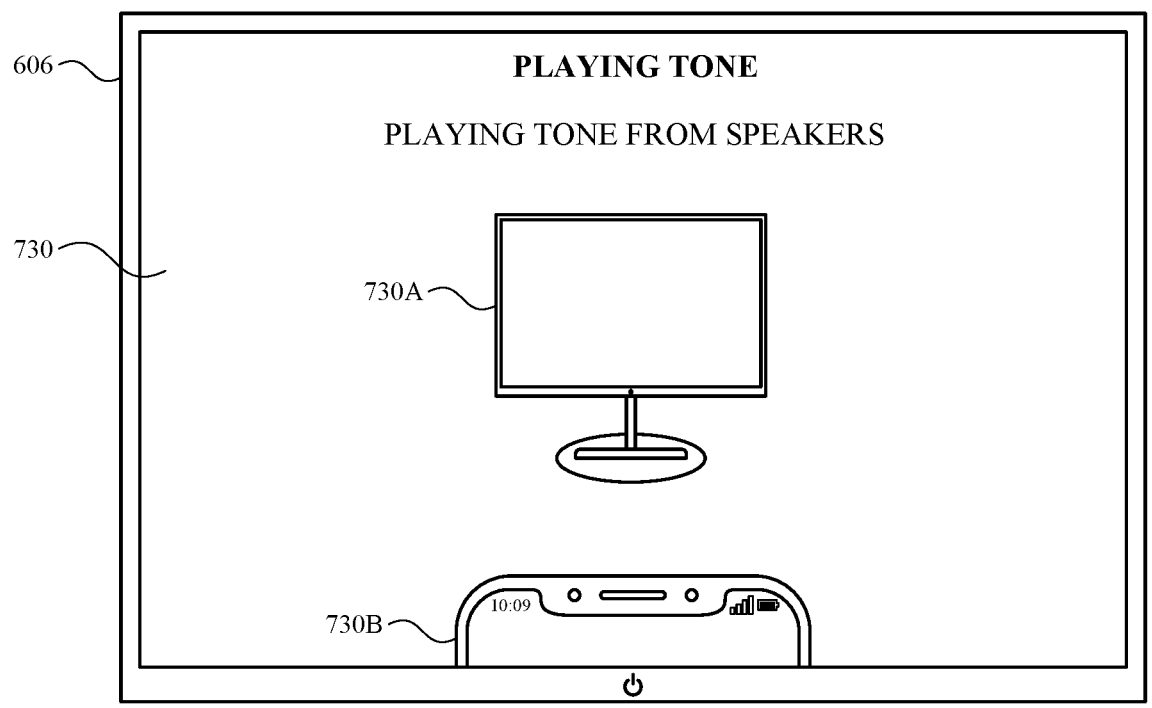
Figure 7D:
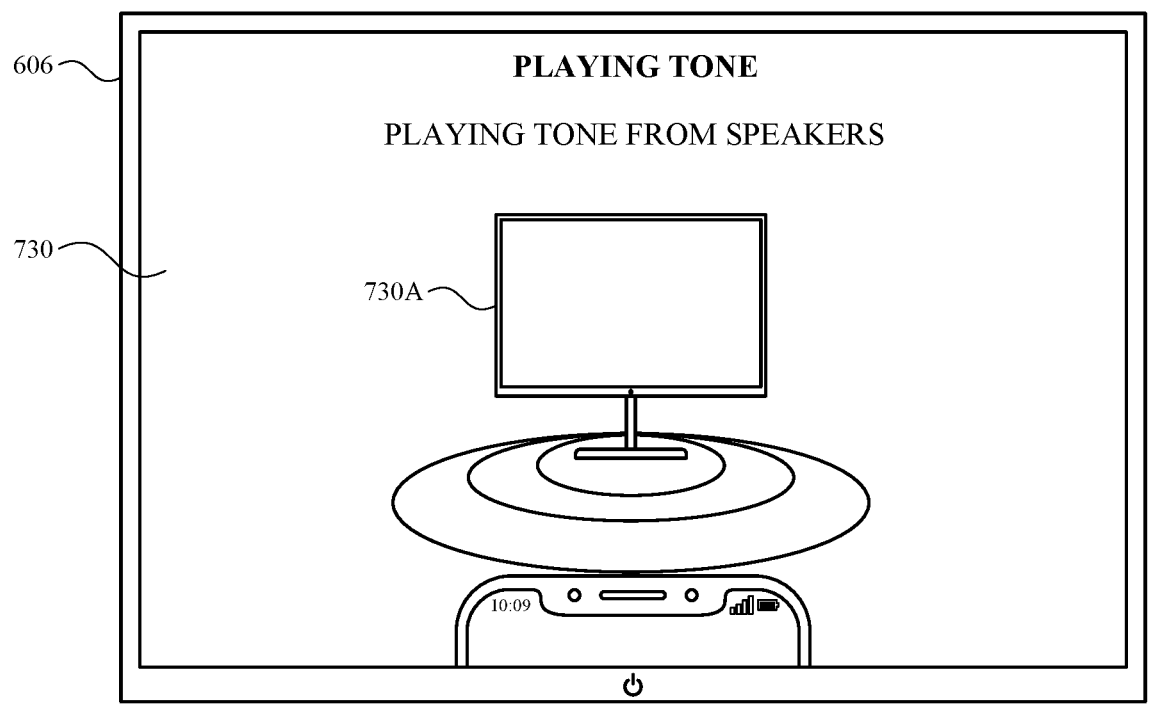

FIGS. 7C-7D illustrate an audio timing synchronization process interface 730, which home media hub 602 causes to be displayed subsequent to transmitting the request to one or more devices to participate in the audio timing synchronization process. For example, home media hub 602 receives data representing one or more of user input 806 (FIG. 8A) and user input 810 (FIG. 8B) received at smartphone 604, and in accordance with receiving such data, causing display of interface 730. Interface 730 includes the text "PLAYING TONE" and "PLAYING TONE FROM SPEAKERS". Thus, interface 730 provides an indication that home media hub 602 is currently causing an audio tone to be output (e.g., output by the speakers of display device 606). Interface 730 also includes a graphical indication 730A that visually indicates that an audio tone is being output. In this example, indication 730A includes a representation of a display device with concentric circles (e.g., representing sound waves) animatedly emanating outward from the depicted display device and growing in size (e.g., in FIG. 7D, the circle representing a sound wave in FIG. 7C has grown to be larger and additional smaller circles are displayed in FIG. 7D).

In some embodiments, an interface includes an indication of a device participating in the audio timing synchronization process. For example, interface 730 also includes an indicator 730B that provides an indication of another device that is participating in the audio timing synchronization process. As shown, indicator 730B resembles the top of smartphone 604 (as shown in FIGS. 6 and 8A). If the tablet (shown in 720A of FIG. 7B) were instead used in the audio timing synchronization process, indicator 730B can be different and provide an indication that the tablet were being used in the audio timing synchronization process. Providing an indication such as 730B can reduce confusion regarding which device is currently participating in an audio timing synchronization process, making the process more user-friendly.

In the example of FIGS. 7C-7D, home media hub 602 causes display device 606, a television, to output audio through device 606's speakers. The outputted audio can be one or more audio tones (e.g., which can or cannot be audible to normal human hearing). An audio tone can include one or more audio frequencies. Contemporaneous in time with the audio output, smartphone 604 is listening (e.g., via one or more microphones) for the one or more audio tones. For example, smartphone 604 displays interface 812 as shown in FIGS. 8C-8D while listening for an audio tone, which is described in more detail below.

Figure 7E:
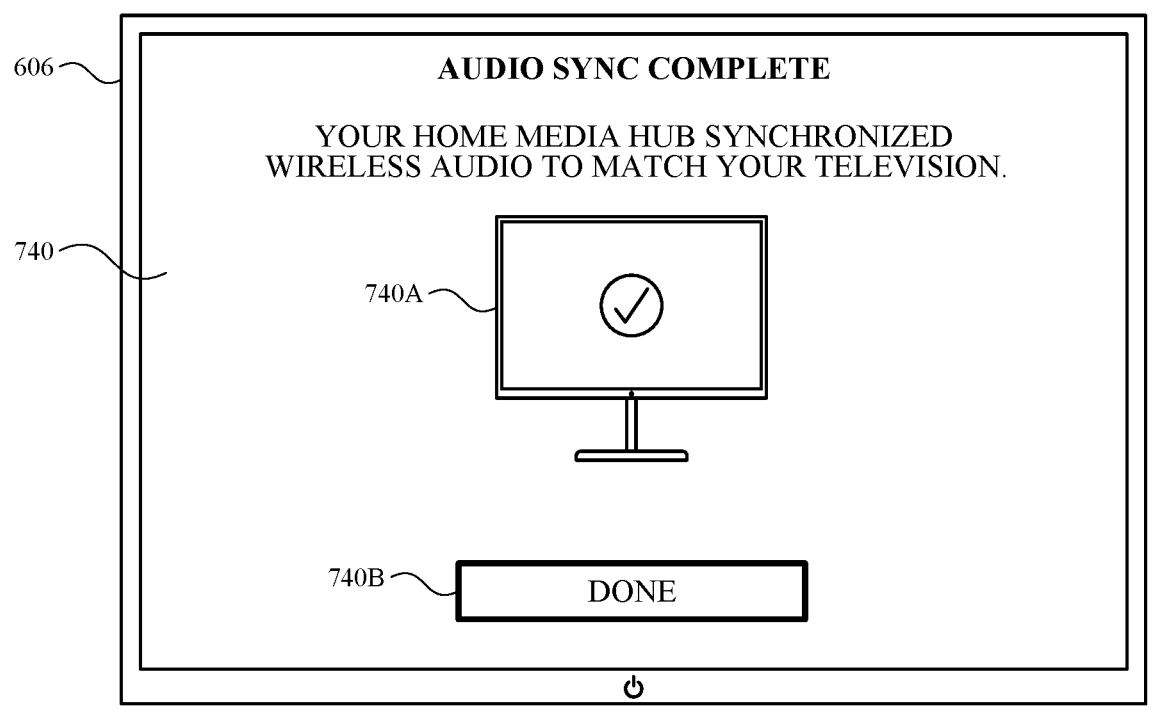

FIG. 7E illustrates interface 740, which home media hub 602 causes to be displayed in response to successful completion of an audio timing synchronization process. Interface 740 includes the text "AUDIO SYNC COMPLETE" and "YOUR HOME MEDIA HUB SYNCHRONIZED WIRELESS AUDIO TO MATCH YOUR TELEVISION". Interface 740 also includes an indicator 740A (e.g., indicating that the audio timing synchronization process is successful, as it includes a checkmark) and affordance 740B (e.g., for closing out the process interface and returning to interface 710).

In some embodiments, successful completion of an audio timing synchronization process includes receiving data from another device (e.g., a second device) (e.g., 604) participating in the audio timing synchronization process. For example, such data can include one or more of: a response indicating that the audio tone was detected, timing information regarding the audio tone (e.g., a timestamp of when the audio tone was detected), and other information (e.g., characteristics of the audio tone that were detected). For example, subsequent to causing output of the audio tone (e.g., while displaying interface 730 as shown in FIGS. 7C-7D), home media hub 602 receives data from smartphone 604 (e.g., via Wi-Fi communication) indicating that smartphone 604 detected the tone and a timestamp associated with the detection of the tone (e.g., the time that the tone began to be detected).

In some embodiments, successful completion of an audio timing synchronization process includes causing an adjustment to one or more audio time synchronization settings. For example, in response to receiving the data from smartphone 604, home media hub 602 causes adjustment of at least one audio timing synchronization setting. In this example, home media hub 602 uses the received data and determines a time delay between a timestamp of when home media hub 602 outputted a signal representing the audio tone, and the timestamp of when smartphone 604 detected the tone. This value gives the time delay between when a signal is outputted and when a listener (e.g., at the position of the smartphone 604 when it detects the tone, such as the position of user in FIG. 6) would hear the corresponding audio output caused by home media hub 602. In this example, adjusting the audio timing synchronization setting includes adding a time delay to audio output from audio output devices 608A and 608B based on the data received from smartphone 604. For example, audio output caused by the speakers of display device 606 can have a delay (e.g., from output of a corresponding signal by home media hub 602 to the arrival of audio output at the position of smartphone 604 in FIG. 6) of five hundred milliseconds. If audio output devices 608A and 608B are capable of outputting audio that reaches smartphone 604 at three hundred milliseconds after output by home media hub 602 of the corresponding signal to the display device 606, then there is a two hundred millisecond difference in synchronization that exists (e.g., before performing an audio timing synchronization process to synchronize the time delays) (e.g., sound from the audio output devices 608A and 608B arrive at the position of device 604 in FIG. 6 two hundred milliseconds before audio output by display device 606). Thus, a two hundred millisecond delay is introduced to the audio output of devices 608A and 608B, so that audio output at these devices of the same corresponding audio signal sent to the display device 606 occurs at five hundred milliseconds after home media hub 602 causes output of the corresponding audio signal, thereby synchronizing the audio output of the various audio output devices.

In some embodiments, an audio output device (e.g., 608A, 608B) has a known audio output delay. For example, because audio output devices 608A and 608B are smart speakers (e.g., are respectively capable of synchronizing audio output between themselves and at least one other audio output device), their audio delay can be determined (e.g., by one of audio output devices 608A or 608B, by home media hub 602). For example, audio output device 608A can synchronize the timing of audio output with audio output device 608B, which involves knowledge of audio output timing by the device 608A. Thus, audio output device 608A has be ability to determine a timestamp associated with its own audio output (e.g., which is used to determine a time delay) or to determine an actual value of a time delay for itself. A time delay of audio output by a device can be due to various factors including technological limitations. In the example provided above, a delay of three hundred milliseconds represents the delay attributable to receiving transmission of media content (e.g., from home media hub 602, from an internet location), processing of such media content, and other technological-based delay.

Figure 7F:
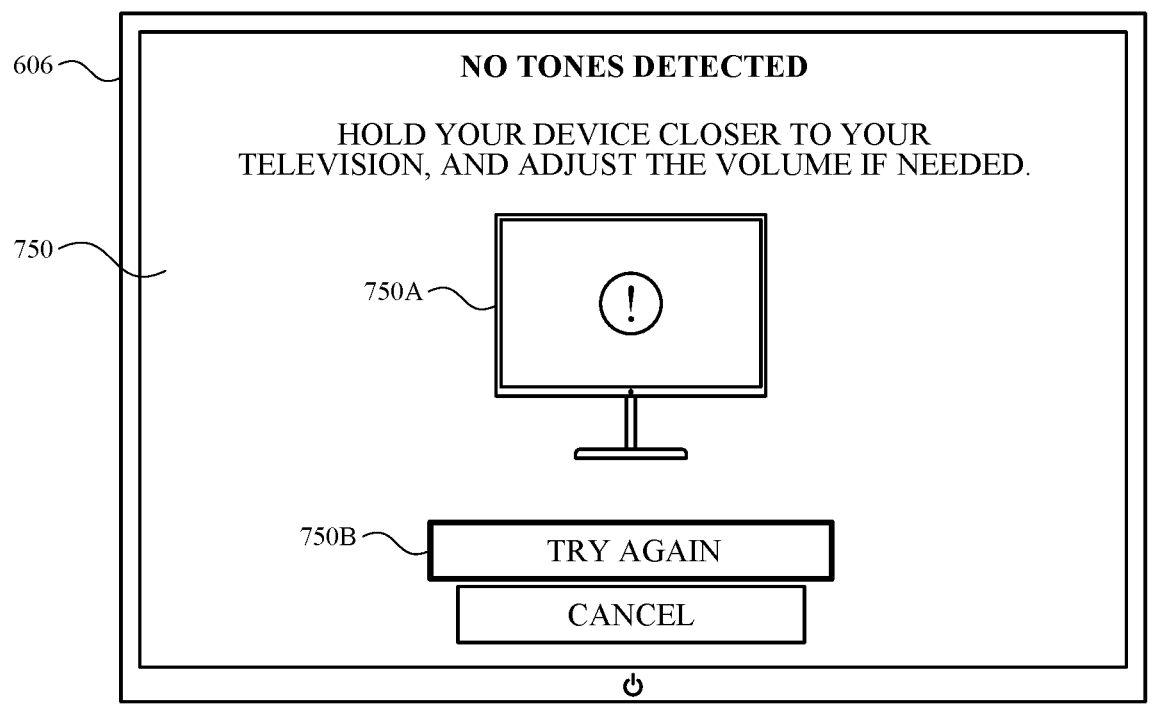

FIG. 7F illustrates interface 750, which home media hub 602 causes to be displayed in accordance with a determination that an audio timing synchronization process did not complete successfully. For example, subsequent to causing output of an audio tone, home media hub 602 does not receive data from smartphone 604 indicating that the audio tone was detected by smartphone 604 (or, alternatively, receives an indication from smartphone 604 that no tone was detected or that the tone was detected but did not meet some quality threshold (e.g., detected at too low of a volume)), and thus home media hub 602 causes interface 750 to be displayed on display device 606. Interface 750 includes the text "NO TONES DETECTED" and "HOLD YOUR DEVICE CLOSER TO YOUR TELEVISION, AND ADJUST THE VOLUME IF NEEDED". Interface 750 includes an (optional) indicator 750A that graphically indicates that the process was not successful (e.g., a depiction of a display device with a symbol "!" overlaid). Interface 750 includes an (optional) affordance 750B that, when selected, causes home media hub 602 to repeat outputting an audio tone (e.g., and causes interface 730 to be displayed again as well).

In some embodiments, user input at another device that is participating in the audio timing synchronization process can cause a device (e.g., home media hub 602) to repeat causing output of an audio tone. In some embodiments, the user input to cause repeating of the tone is received at a first device (e.g., home media hub 602) (e.g., only 602 displays a selectable affordance for causing repeating of the audio tone), at a second device (e.g., smartphone 604) (e.g., only 604 displays a selectable affordance for causing repeating of the audio tone), or at either the first device or the second device (e.g., both 602 and 604 cause selectable options to be displayed on respective display devices).

FIGS. 8A-8F illustrate exemplary interfaces for performing an audio timing synchronization process using a second device (e.g., 604) participating in an audio timing synchronization process with a first device (e.g., 602). In the examples in FIGS. 8A-8F, smartphone 604 is connected to home media hub 602, which is connected to display device 606 and audio output devices 608A-608B, as described above with respect to FIG. 6.

FIG. 8A illustrates an exemplary notification (e.g., 804) prompting acceptance of a request to participate in an audio timing synchronization process with a first device (e.g., 602). In some embodiments, a second device (e.g., 604) displays a notification (e.g., 804) in response to receiving a request to participate in an audio timing synchronization process (e.g., from a first device, such as home media hub 602). In this example, notification 804 is displayed at a lock screen interface 802 on display device 604A of smartphone 604. Notification 804 includes the text "TELEVISION" and "WIRELESS AUDIO SYNC" AND "TAP TO USE THIS PHONE TO MEASURE HOW LONG YOUR HOME MEDIA HUB TAKES TO PLAY AUDIO & VIDEO". As shown in FIG. 8A, smartphone 604 receives user input 806*a* tap on notification 804—representing acceptance of the request to participate in the audio timing synchronization session with the first device (e.g., home media hub 602). In some embodiments, in response to receiving user input (e.g., 806) representing acceptance of the request to participate in the audio timing synchronization session with the first device, the second device (e.g., 604) transmits a response to the first device (e.g., 602). For example, in response to receiving user input 806, smartphone 604 transmits an acceptance to home media hub 602 while home media hub 602 is causing interface 720 (FIG. 7B) to be displayed. In response to receiving the acceptance, home media hub 602 replaces interface 720 with interface 730 (FIGS. 7C-7D). In some embodiments, in response to receiving user input (e.g., 806) representing acceptance of the request to participate in the audio timing synchronization session with the first device, the second device (e.g., 604) causes display of an audio timing synchronization process interface (e.g., 808) and, optionally, ceases displaying or changes an appearance of the notification (e.g., 804). For example, in response to receiving user input 806, smartphone 604 displays audio timing synchronization process interface 808 in FIG. 8B.

Figure 8B:
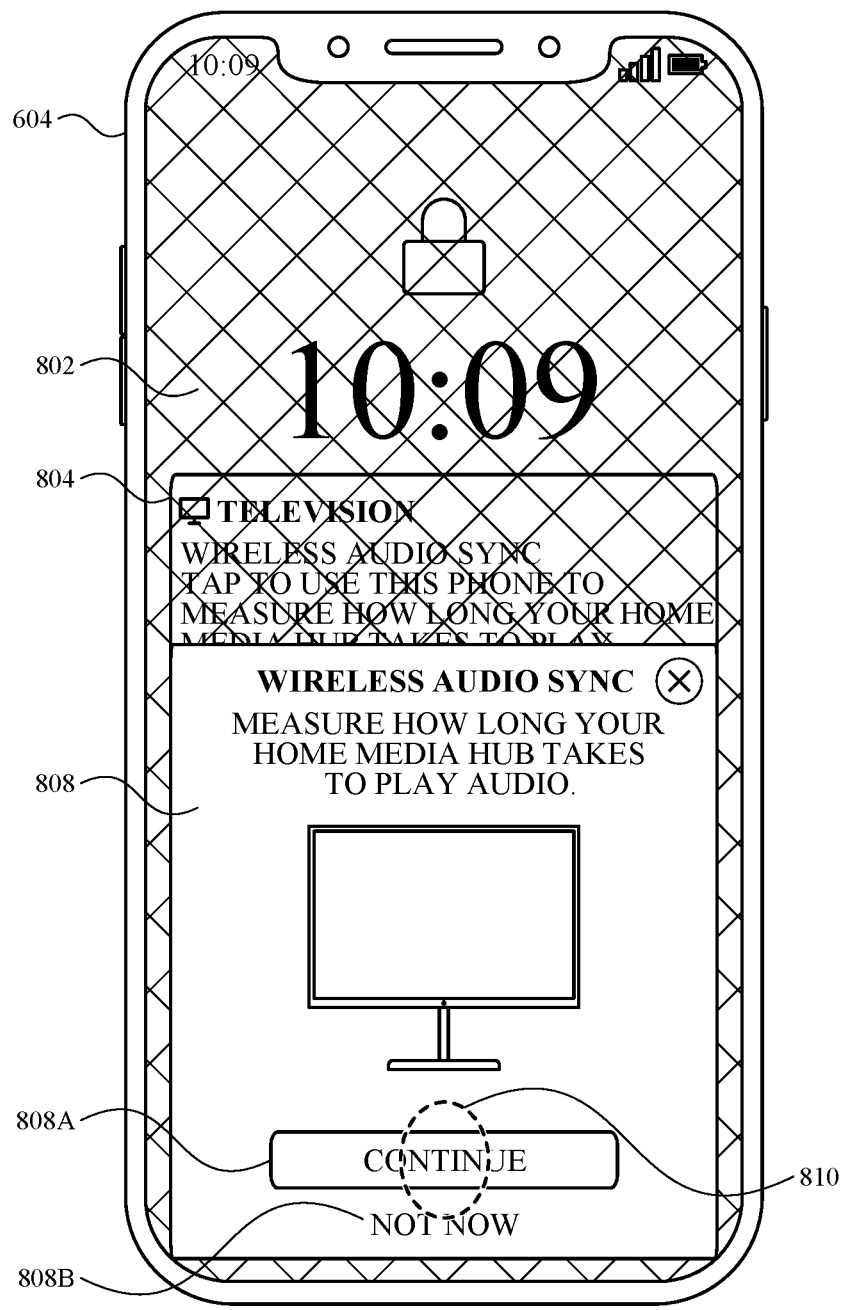
Figure 8C:
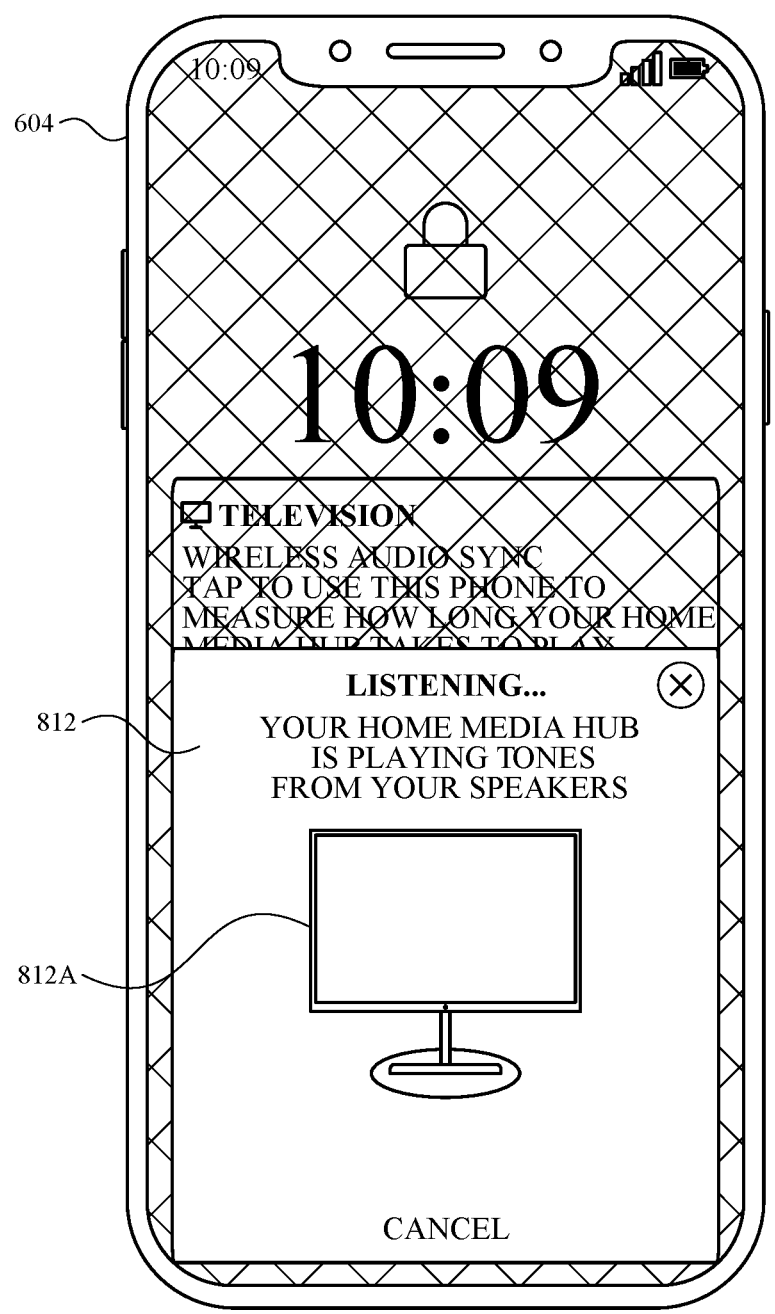
Figure 8D:
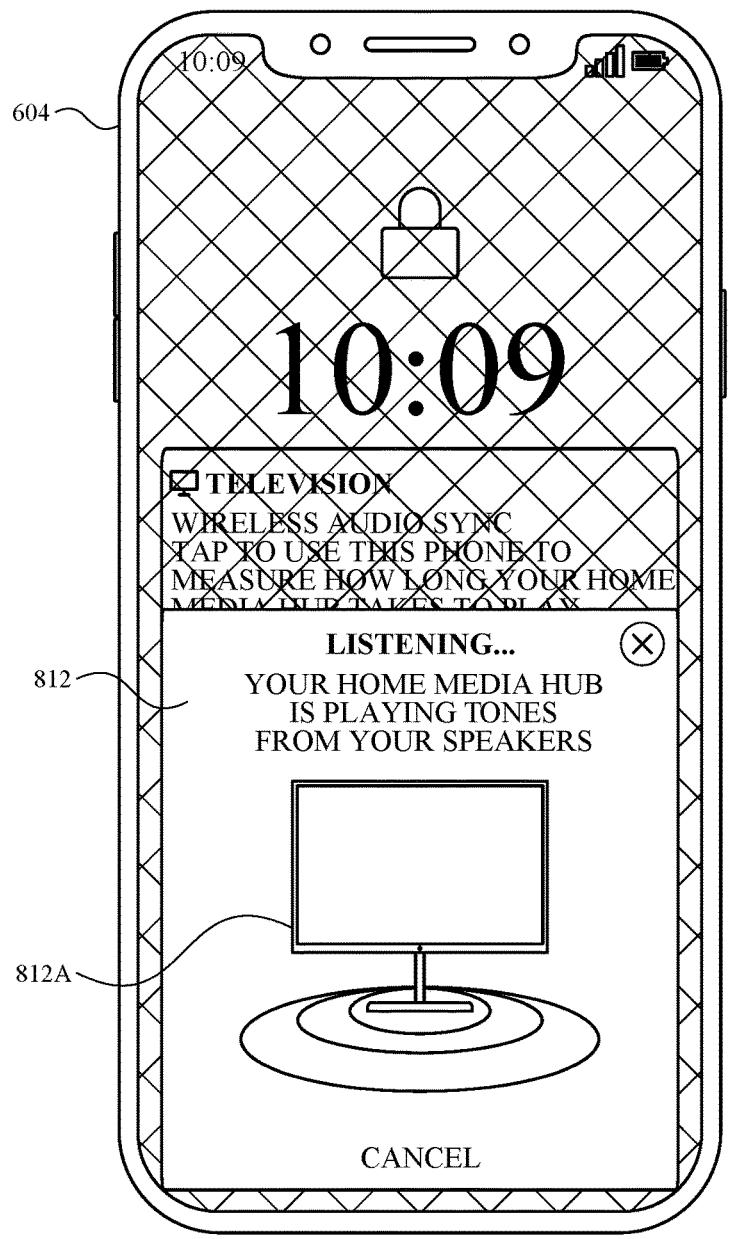
Figure 9:
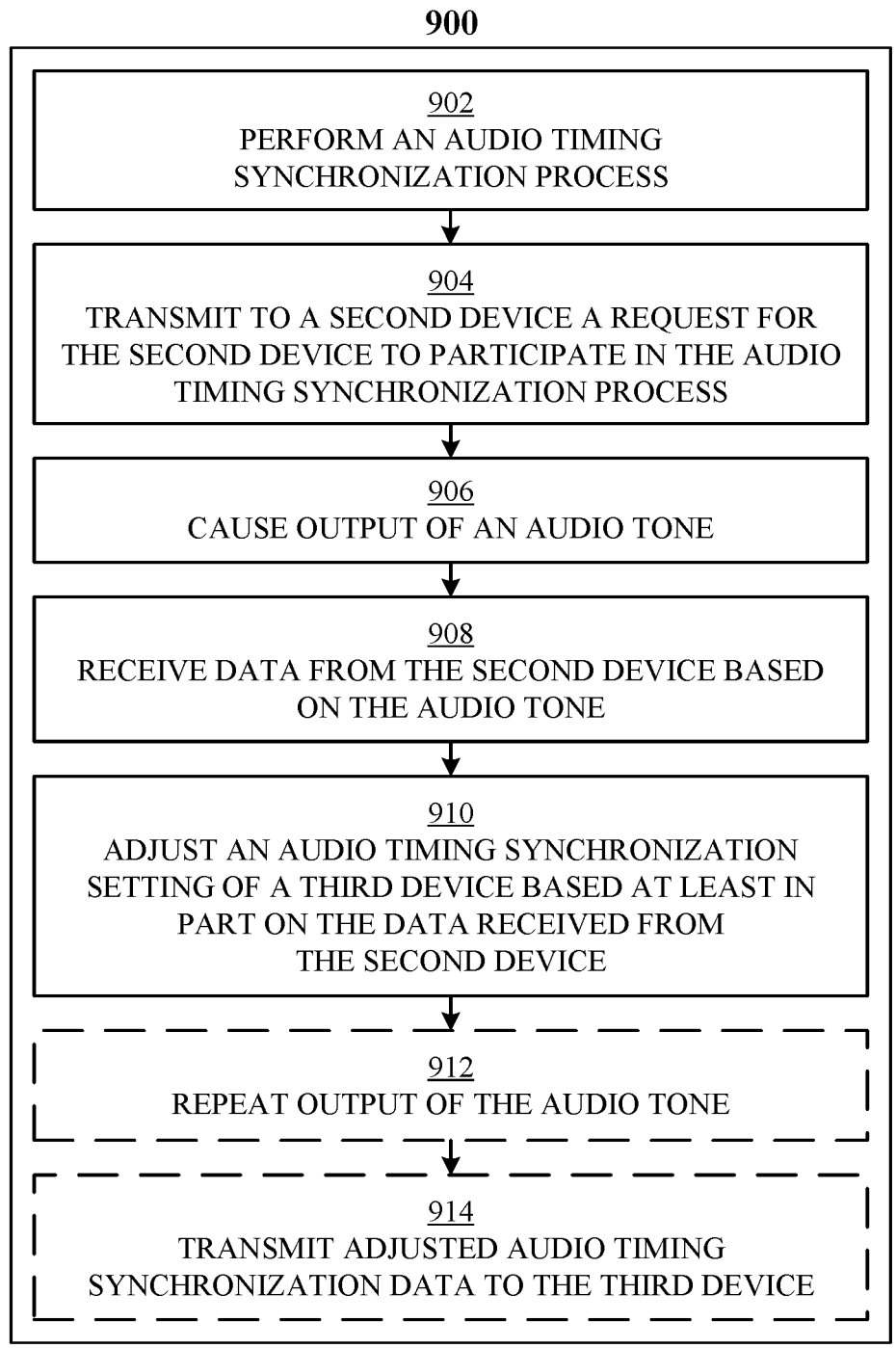
FIG. 9 is a flow diagram illustrating methods for performing an audio timing synchronization process, in accordance with some embodiments.

FIG. 8B illustrates an exemplary audio timing synchronization process interface 808. As shown, interface 808 is displayed overlaid on lock screen interface 802, which is also displayed with a changed (e.g., dimmed) appearance (e.g., as illustrated by the crosshatching lines covering notification 804). Interface 808 includes the text "WIRELESS AUDIO SYNC" and "MEASURE HOW LONG YOUR TV TAKES TO PLAY AUDIO". In some embodiments, an audio timing synchronization process interface (e.g., 808) includes an affordance (e.g., 808A) for proceeding with at least a portion of the audio timing synchronization process. For example, interface 808 includes continue affordance 808A. Interface 808 also includes a cancel affordance 808B (with the text "NOT NOW") that, when selected, causes the smartphone 604 to forgo proceeding with the audio timing synchronization process, and optionally exits/cancels the smartphone's participation in the audio timing synchronization process.

In some embodiments, a first device (e.g., 602) causes output of an audio tone in accordance with an indication that user input (e.g., 810) is received at a second device (e.g., 604). For example, as described above, an exemplary first device (home media hub 602) can await user input at an exemplary second device (smartphone 604) before causing output of the an audio tone, giving the user control of when the tone is output and an opportunity the position of the second device (e.g., at the normal listening position of the home media system 600, such as the center of a couch). FIG. 8B illustrates such an input 810. For example, while smartphone 604 displays interface 808, home media hub 602 causes display of interface 720 of FIG. 7B, instructing a user to provide user input (such as 810) at a nearby device (such as smartphone 604). In response to user input 810 at smartphone 604, home media hub causes display of interface 730 of FIG. 7C and causes output of an audio tone.

FIG. 8C illustrates an exemplary audio timing synchronization process interface 812, which smartphone 604 causes to be displayed while listening for an audio tone (e.g., that the first device causes to be output, home media hub 602 in this example). For example, smartphone 604 displays interface 812 in response to receiving user input 810 (FIG. 8B). Interface 812 includes the text "LISTENING . . . " and "YOUR HOME MEDIA HUB IS PLAYING TONES FROM YOUR SPEAKERS". Thus, interface 812 provides an indication that home media hub 602 is currently causing an audio tone to be output (e.g., output by the speakers of display device 606). Interface 812 also includes a graphical indication 812A that visually indicates that an audio tone is being output (e.g., similar to as described above with respect to interface 730) and/or that smartphone 604 is listening for an audio tone. In this example, indication 812A includes a representation of a display device with concentric circles (e.g., representing sound waves) animatedly emanating outward from the depicted display device and growing in size (e.g., in FIG. 8D, the circle representing a sound wave in FIG. 8C has grown to be larger and additional smaller circles are displayed in FIG. 8D).

Figure 8E:
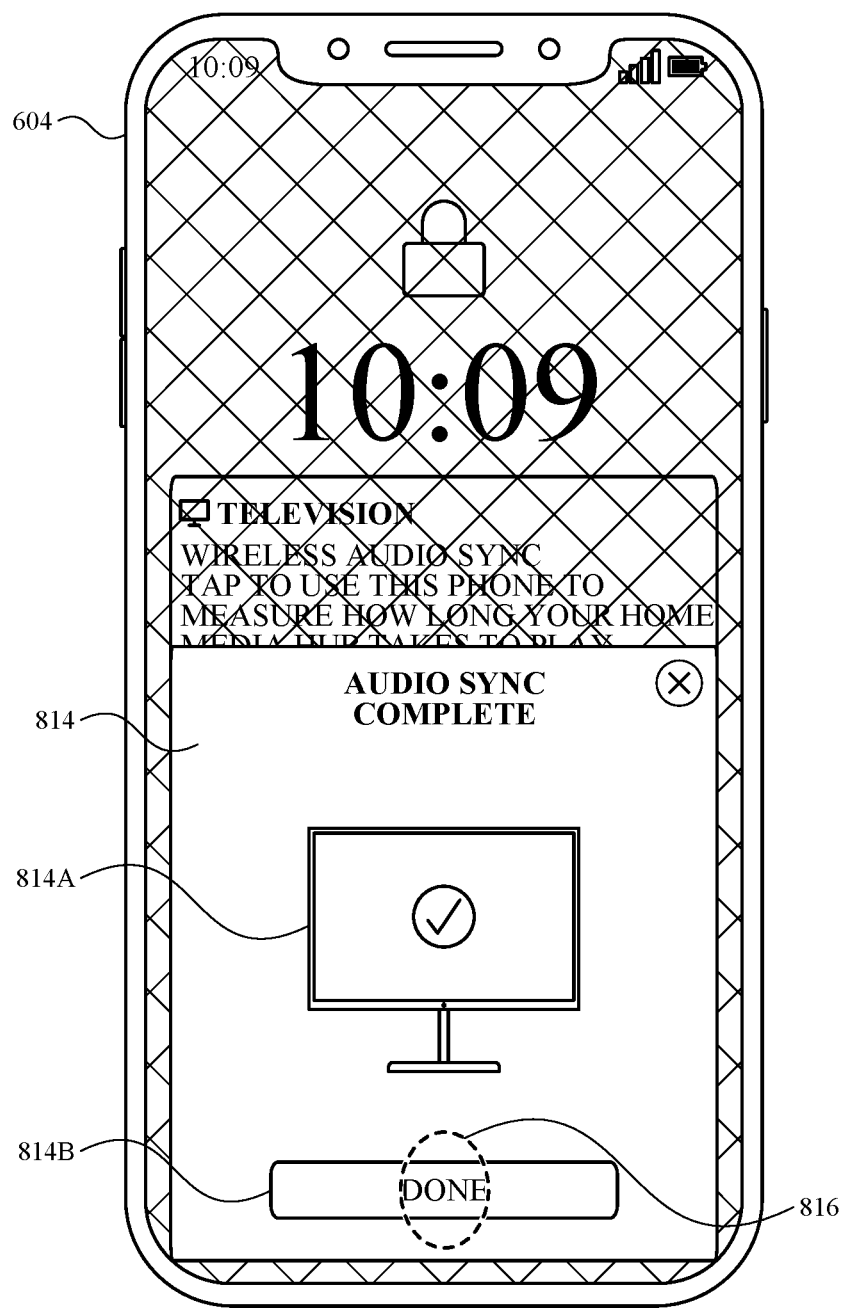

FIG. 8E illustrates an audio timing synchronization process interface 814, which smartphone 604 causes to be displayed in response to successful completion of an audio timing synchronization process. Interface 814 includes the text "AUDIO SYNC COMPLETE". Interface 814 also includes an indicator 814A (e.g., indicating that the audio timing synchronization process is successful, as it includes a checkmark) and affordance 814B (e.g., for closing out the process interface and returning to interface 802 as shown in FIG. 8A). In FIG. 8E, smartphone receives user input 816 (a tap), representing selection of affordance 814B (e.g., cause smartphone 604 to display lock screen interface 802 (without or without changing its appearance)).

In some embodiments, successful completion of an audio timing synchronization process includes transmitting, by a second device (e.g., 604), data to a first device (e.g., 602) participating in the audio timing synchronization process. For example, such data can include one or more of: a response indicating that the audio tone was detected, timing information regarding the audio tone (e.g., a timestamp of when the audio tone was detected), and other information (e.g., characteristics of the audio tone that were detected). For example, subsequent to detecting the audio tone (e.g., while interface 812 is displayed as shown in FIGS. 8C-8D), smartphone 604 transmits data to home media hub 602 (e.g., via Wi-Fi communication) indicating that smartphone 604 detected the tone and a timestamp associated with the detection of the tone (e.g., the time that the tone began to be detected). In some embodiments, successful completion of an audio timing synchronization process includes receiving confirmation that such data was received by a first device (e.g., by 602).

In some embodiments, successful completion of an audio timing synchronization process includes causing an adjustment to one or more audio time synchronization setting. For example, a first device can cause the adjustment (e.g., home media hub 602, as described above). In some embodiments, a second device that detected the audio tone output causes an adjustment of an audio timing synchronization setting. For example, smartphone 604 causes adjustment of at least one audio timing synchronization setting, as described above with respect to home media hub 602 causing an adjustment of an audio timing synchronization setting. For example, smartphone 604 can use data (e.g., from the audio tone, received from the first device (e.g., home media hub 602)) and determine a time delay between a timestamp of when home media hub 602 outputted a signal representing the audio tone, and the timestamp of when smartphone 604 detected the tone. In such example, adjusting the audio timing synchronization setting includes adding a time delay to audio output from audio output devices 608A and 608B, similar to as described above with respect to FIG. 7E. In some embodiments, successful completion of an audio timing synchronization process includes receiving confirmation that an audio setting was adjusted (e.g., by 602).

Figure 8F:
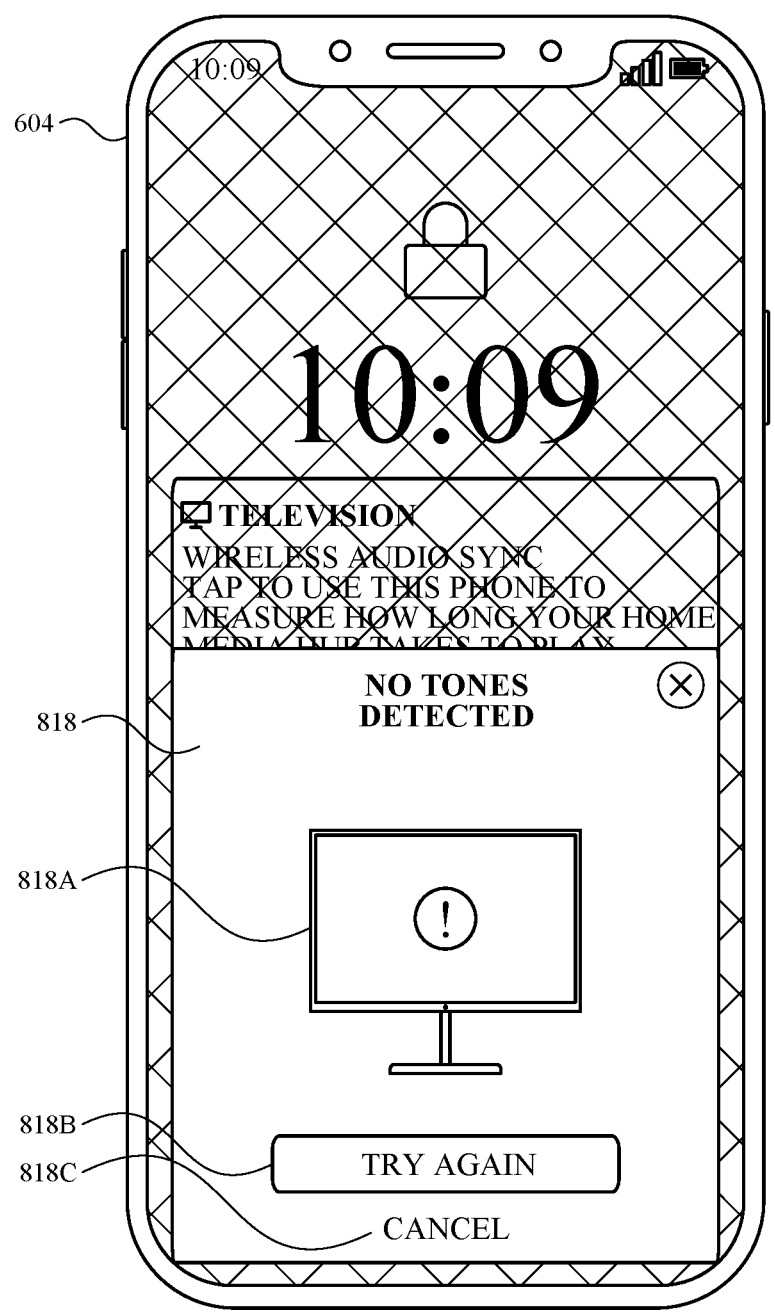

FIG. 8F illustrates an audio timing synchronization process interface 818, which smartphone 604 causes to be displayed in accordance with a determination that an audio timing synchronization process did not complete successfully. For example, subsequent to home media hub 602 causing output of an audio tone, smartphone 604 does not successfully detect the audio tone. In such case, smartphone 604 can transmit an indication to home media hub 602 that it did not detect an audio tone or that the tone was detected but did not meet some quality threshold (e.g., detected at too low of a volume). Alternatively, smartphone 604 can forgo transmitting an indication to home media hub 602 that a tone was detected (e.g., in which case home media hub 602 infers that no tone was detected after some timeout period). In the case that the audio timing synchronization process did not complete successfully, smartphone 604 causes interface 818 to be displayed. Interface 818 includes the text "NO TONES DETECTED". Interface 818 includes an (optional) indicator 818A that graphically indicates that the process was not successful (e.g., a depiction of a display device with a symbol "!" overlaid. Interface 818 includes an (optional) affordance 818B that, when selected, causes home media hub 602 to repeat outputting an audio tone (e.g., similar to as described above with respect to selection of affordance 750B of FIG. 7F). In some embodiments, user input (e.g., selection of affordance 750B of FIG. 7F) at another device (e.g., home media hub 602) that is participating in the audio timing synchronization process can cause a device (e.g., home media hub 602) to repeat causing output of an audio tone.

In the examples discussed above with respect to FIGS. 6, 7A-7F, and 8A-8F, an audio timing synchronization process was described as including at least a first device (e.g., 602) and a second device (e.g., 604). In some embodiments, an audio timing synchronization process includes two or more devices.

While the interfaces described above with respect to FIGS. 7A-7F are described as being caused to be displayed by exemplary device home media hub 602, one or more of such interfaces can be displayed (or caused to be displayed) by any device (e.g., participating in an audio timing synchronization process). While the interfaces described above with respect to FIGS. 8A-8F are described as being displayed on exemplary device smartphone 604, one or more of such interfaces can be displayed (or caused to be displayed) by any device (e.g., participating in an audio timing synchronization process).

FIG. 9 is a flow diagram illustrating a method for performing an audio timing synchronization process using an electronic device in accordance with some embodiments. Method 900 is performed at a first device (e.g., a home media hub, a smart device) (e.g., 100, 300, 500) with a communication device (e.g., transmitter and/or receiver circuitry for communicating via wired and/or wireless transmission mediums (e.g., via Wi-Fi, Bluetooth, or the like)). Some operations in method 900 are, optionally, combined, the orders of some operations are, optionally, changed, and some operations are, optionally, omitted.

As described below, method 900 provides an intuitive way for performing an audio timing synchronization process. The method reduces the cognitive burden on a user for performing an audio timing synchronization process, thereby creating a more efficient human-machine interface. For battery-operated computing devices, enabling a user to perform an audio timing synchronization process faster and more efficiently conserves power and increases the time between battery charges.

The first device (e.g., 602) performs (902) an audio timing synchronization process.

During the audio timing synchronization process, the first device transmits (904), via the communication device, to a second device (e.g., 604) (e.g., a device (e.g., smartphone, tablet computer) that is connected to same Wi-Fi; a device in Bluetooth range), a request for the second device to participate in the audio timing synchronization process. In some embodiments, the first device receives confirmation (e.g., acceptance) that the second device will participate in the audio timing synchronization process. For example, the first device waits on receiving confirmation from the second device as a condition for proceeding with at least a portion of the audio timing synchronization process (e.g., for causing display of a user interface (e.g., a next interface is a set of configuration user interfaces), for causing output of an audio tone, or the like). In some embodiments, the first device receives a second confirmation (e.g., after the first confirmation) as a condition for proceeding with at least a portion (e.g., a different portion) of the audio timing synchronization process. For example, the first device receives confirmation that the second device will participate, and a subsequent confirmation when the second device is ready to listen for the audio tone. For example, a user input at the second device can accept a request to participate with the second device, and a subsequent user input at the second device can indicate that the audio tone should be played (e.g., giving the user a chance to position the second device, reduce ambient noise, or the like).

In some embodiments, transmitting the request for the second device to participate in the audio timing synchronization process further includes the first device transmitting, via the communication device, to a fourth device (e.g., 612) (e.g., a device other than the first device and other than the second device) a second request (e.g., the same request as transmitted to the second device) for the fourth device to participate in the audio timing synchronization process (e.g., requests sent to multiple individual devices). In some embodiments, confirmation or acceptance to participate in the audio timing synchronization process is received from the second device and/or the fourth device. For example, confirmation/acceptance is received from multiple devices (e.g., one or more of the accepting devices are selected for performing the audio timing synchronization process). In some embodiments, a single device is used in the audio timing synchronization process (e.g., the first to respond). In some embodiments, multiple devices are used in the audio timing synchronization process. In some embodiments, transmitting requests to a plurality of (e.g., nearby) devices to participate in an audio timing synchronization process provides an efficient configuration operation that has an increased chance of finding a device to participate in the audio timing synchronization process and thus a reduced chance of failure. Performing an optimized operation when a set of conditions has been met without necessarily requiring further user input enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently. In some embodiments, transmitting requests to a plurality of (e.g., nearby) devices to participate in an audio timing synchronization process can provide options (e.g., to a user) for selecting which device will participate in the audio timing synchronization process with the first device, and allow selection of a preferred device or multiple devices for participation. Performing an optimized operation when a set of conditions has been met without necessarily requiring further user input enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

During the audio timing synchronization process, subsequent to (e.g., in response to user input at the second device; in response to a handshake with the second device) the first device transmitting the request to the second device, the first device causes (906) an output of an audio tone (e.g., output by the first device, output by one or more other devices different than the first device and the second device, and/or output by some combination of the first device and the one or more other devices) (e.g., by the TV or audio receiver).

In some embodiments, the first device is connected to a display device (e.g., 606) (e.g., a display device integrated into the first device, a display device connected to the first device by wire or wirelessly). In some embodiments, while causing output of the audio tone, the first device causes display (e.g., on a display device of the first device and/or of an external device (e.g., a TV)), via the display device, of a graphical indication (e.g., 730A) (e.g., an animation) that an audio tone is being output.

In some embodiments, the first device receives data representing a third user input (e.g., a selection of affordance 710A, a selection of affordance 810) (e.g., user input at the first device, user input at an external device (e.g., second device) in communication with the first device (e.g., a remote control, a smart phone)). In some embodiments, at least a portion of the audio timing synchronization process is performed by the first device in response to receiving the data representing the third user input. In some embodiments, the first input is received while causing display of an audio timing synchronization configuration interface. For example, while the first device causes an external display (e.g., TV) to display an audio timing synchronization configuration interface. In some embodiments, the first input represents selection of an affordance displayed at the audio timing synchronization configuration interface. In some embodiments, performing at least a portion of the audio timing synchronization process in response to a user input (e.g., received at a first device, or a second device) provides control (e.g., to a user) for controlling timing of the audio timing synchronization process by the first device, and can allow selection (e.g., by a user) of a preferred device for participation. Providing additional control options without cluttering the UI with additional displayed controls enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

In some embodiments, the request (e.g., a request that causes display of notification 804) for the second device to participate in the audio timing synchronization process is transmitted in response to receiving the data representing the third user input (e.g., selection of a notification displayed on the second device in response to the second device receiving the request to participate).

In some embodiments, the output of the audio tone is caused in response to receiving the data representing the third user input. In some embodiments, outputting an audio tone used in an audio timing synchronization process in response to a user input (e.g., received at a second device) provides control (e.g., to a user) for controlling timing of the audio timing synchronization process audio output by the first device. Providing additional control options without cluttering the UI with additional displayed controls enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

In some embodiments, the third user input (e.g., selection of 710A) is received at the first device (e.g., via user interaction with the first device, or with a remote control for controlling the first device and in communication with the first device).

In some embodiments, the third user input (e.g., 806, 810) is received at the second device (e.g., via user interaction with the second device, or with a remote control for controlling the second device and in communication with the second device).

During the audio timing synchronization process, subsequent to causing the output of the audio tone, the first device receives (908) data (e.g., a timestamp of when the audio tone was detected by the second device) from the second device based on the audio tone. In some embodiments, the data is a difference between two timestamps. For example, the first device provides the second device with a timestamp when the output was caused, and the second device determines a timestamp of when the audio tone was detected, and determines a difference between the two timestamps. In some embodiments, the first device determines the difference between the two timestamps (e.g., after the second device provides the timestamp of when the audio tone was detected by the second device to the first device).

In some embodiments, the first device determines (e.g., calculates, looks up in a look-up table) a value representing a time delay (e.g., difference) between a first timestamp corresponding to an output time of the audio tone and a second timestamp corresponding to a time of detection by the second device of the outputted audio tone. In some embodiments, the value representing the time delay is used to determine an adjusted audio timing synchronization setting for the third device. In some embodiments, the adjusted audio timing synchronization setting for the third device is a second time delay (e.g., the same or different than the time delay represented by the value). For example, based on the value representing the time delay (e.g., the time it takes for a TV to output audio), a second time delay is used to delay audio output the third device (e.g., a smart speaker). In this example, the second time delay is introduced (e.g., at the first device, at the third device) into the audio output of the third device so that audio output from the third device and another device (e.g., a TV) appear to be in synchronization to a listener when the devices are outputting the same content simultaneously. In some embodiments, the second time delay is different than the time delay (e.g., a first time delay). For example, the second time delay can be smaller than the first time delay, reduced by some amount of time delay (e.g., time delay that results for technical reasons including delay due to audio signal processing and transmission between the first device and the third device). In some embodiments, the device determines a value representing a time delay between when the second device hears an audio output (e.g., tone) from one device and when the second device hears an audio output (e.g., tone) output by another (different) device. For example, the time delay represents the difference in time when audio output by two sources arrives at the second device. In this example, such a time delay can be used to delay the audio output of the device whose audio output arrives at the second device first.

During the audio timing synchronization process, the first device adjusts (910) an audio timing synchronization setting (e.g., adjusting or adding a delay to output of one or more audio signals) of a third device (e.g., the first device, a third device different than the first device and the second device) (e.g., a smart speaker not used in the sync process) based at least in part on the data received from the second device. In some embodiments, adjusting an audio timing synchronization setting based at least in part on data received from a second device that is based on an audio tone output by a first device provides an efficient configuration operation for correcting synchronization errors that requires minimal user input. Performing an optimized operation when a set of conditions has been met without necessarily requiring further user input enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

In some embodiments, adjusting the audio timing synchronization setting of the third device (e.g., 608A, 608B) includes the first electronic device transmitting (914), via the communication device, adjusted audio timing synchronization data (e.g., a new or updated value of a time delay) to the third device. In some embodiments, the adjusted audio timing setting is maintained by (e.g., stored on) with the first device. For example, the first device subsequently uses the adjusted audio timing synchronization setting to affect output/delivery (e.g., by the first device) of one or more audio signals to one or more devices (e.g., to delay delivery of an outputted audio signal, to introduce a shift of the outputted audio signal relative to a video signal, or the like).

In some embodiments, subsequent to causing the output of the audio tone, in accordance with a determination that a set of criteria indicating that the second device did not detect the audio tone (e.g., did not detect via a microphone, or did not detect with a sufficient quality (e.g., without excessive noise) or for a required length of time) is met (e.g., set of criteria is met when one or more of the following occurs: receiving user input (e.g., at the first device) (e.g., selecting "Try Again") or an indication of user input (e.g., from the second device), receiving an indication from the second device that tone was not detected or that some error occurred (e.g., partial tone heard, audio interference detected), or not receiving data/a response from the second device within a predetermined period of time (e.g., a response timeout period)), the first device repeats (912) output of the audio tone (e.g., one or more times). In some embodiments, audio tone is repeated a predetermined number of times (e.g., three times) if the set of criteria continues to be met (e.g., after each repetition). In some embodiments, repeating output of an audio tone if a set of criteria is met provides an efficient configuration operation for handling errors that requires minimal user input. Performing an optimized operation when a set of conditions has been met without necessarily requiring further user input enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

In some embodiments, the set of criteria includes a criterion that is met when a first user input (e.g., selection of affordance 750B) is received, at the first device, representing a request to repeat output of the audio tone (e.g., input representing selection of an affordance (e.g., Try Again) at a displayed interface (e.g., caused to be displayed by the first device)).

In some embodiments, the set of criteria includes a criterion that is met when a second user input (e.g., selection of affordance 818B) is received, at the second device, representing a request to repeat output of the audio tone (e.g., input representing selection of an affordance (e.g., Try Again) at a displayed interface (e.g., caused to be displayed by the first device)).

In some embodiments, the third device (e.g., 608A, 608B, a smart speaker) is different than the first device and different than the second device. In some embodiments, the first device causes adjustment of audio timing synchronization settings for a plurality of devices. For example, different respective delays can be configured for the delivery of respective audio signals (e.g., corresponding to different audio channels) to different devices in need of audio timing synchronization (e.g., speakers). In some embodiments, adjusting an audio timing synchronization setting for a third device that is not a first or second device participating in an audio timing synchronization process provides an efficient configuration operation for correcting synchronization errors that requires minimal (e.g., no) user input at the third device (e.g., which may not have a user-friendly interface). Performing an optimized operation when a set of conditions has been met without necessarily requiring further user input (e.g., at a device being configured) enhances the operability of the device and makes the user-device interface more efficient (e.g., by reducing the number of inputs needed, and/or by helping the user to provide proper inputs and reducing user mistakes when operating/interacting with the device) which, additionally, reduces power usage and improves battery life of the device by enabling the user to use the device more quickly and efficiently.

In some embodiments, while performing a process for configuring a plurality of settings of the first device, the first device automatically performs (e.g., without requiring/not directly in response to a user input receiving at the first device or another device) (e.g., no display of an audio timing synchronization configuration interface) the audio timing synchronization process (e.g., a request to participate is automatically transmitted to one or more devices during a configuration process, followed by receiving of data from such devices based on an outputted audio tone and adjusting of an audio timing synchronization setting).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve audio synchronization. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve audio synchronization (e.g., for media accessed using personal account information). Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide account information for accessing certain audio media. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
a communication device;
one or more processors; and
memory storing one or more programs configured to be executed by the one or more processors, the one or more programs including instructions for:
performing an audio timing synchronization process that includes:
transmitting, via the communication device, to a second device, a request for the second device to participate in the audio timing synchronization process;
subsequent to transmitting the request to the second device, causing an output of an audio tone;
subsequent to causing the output of the audio tone, receiving, from the second device, data generated based on the output of the audio tone; and
adjusting an audio timing synchronization setting of a third device based at least in part on the data received from the second device.

2. The electronic device of claim 1, the one or more programs further including instructions for:
subsequent to causing the output of the audio tone:
in accordance with a determination that a set of criteria indicating that the second device did not detect the audio tone is met, repeating output of the audio tone.

3. The electronic device of claim 2, wherein the set of criteria includes a criterion that is met when a first user input is received, at the electronic device, representing a request to repeat output of the audio tone.

4. The electronic device of claim 2, wherein the set of criteria includes a criterion that is met when a second user input is received, at the second device, representing a request to repeat output of the audio tone.

5. The electronic device of claim 1, wherein the third device is different than the electronic device and different than the second device.

6. The electronic device of claim 1, wherein adjusting the audio timing synchronization setting of the third device comprises:
transmitting, via the communication device, adjusted audio timing synchronization data to the third device.

7. The electronic device of claim 1, the one or more programs further including instructions for:
determining a value representing a time delay between a first timestamp corresponding to an output time of the audio tone and a second timestamp corresponding to a time of detection by the second device of the outputted audio tone.

8. The electronic device of claim 1, wherein the electronic device is connected to a display device, the one or more programs further including instructions for:
while causing output of the audio tone, causing display, via the display device, of a graphical indication that the audio tone is being output.

9. The electronic device of claim 1, wherein transmitting the request for the second device to participate in the audio timing synchronization process comprises:
transmitting, via the communication device, to a fourth device a second request for the fourth device to participate in the audio timing synchronization process.

10. The electronic device of claim 1, the one or more programs further including instructions for:
receiving data representing a first user input, wherein at least a portion of the audio timing synchronization process is performed in response to receiving the data representing the first user input.

11. The electronic device of claim 10, wherein the request for the second device to participate in the audio timing synchronization process is transmitted in response to receiving the data representing the first user input.

12. The electronic device of claim 10, wherein the output of the audio tone is caused in response to receiving the data representing the first user input.

13. The electronic device of claim 10, wherein the first user input is received at the electronic device.

14. The electronic device of claim 10, wherein the first user input is received at the second device.

15. The electronic device of claim 1, the one or more programs further including instructions for:
while performing a process for configuring a plurality of settings of the electronic device, automatically performing the audio timing synchronization process.

16. A non-transitory computer-readable storage medium storing one or more programs configured to be executed by one or more processors of an electronic device with a communication device, the one or more programs including instructions for:
performing an audio timing synchronization process that includes:

transmitting, via the communication device, to a second device, a request for the second device to participate in the audio timing synchronization process;

subsequent to transmitting the request to the second device, causing an output of an audio tone;

subsequent to causing the output of the audio tone, receiving, from the second device, data generated based on the output of the audio tone; and adjusting an audio timing synchronization setting of a third device based at least in part on the data received from the second device.

17. A computer-implemented method, comprising:
at an electronic device with a communication device:
performing an audio timing synchronization process that includes:
transmitting, via the communication device, to a second device, a request for the second device to participate in the audio timing synchronization process;

subsequent to transmitting the request to the second device, causing an output of an audio tone;

subsequent to causing the output of the audio tone, receiving, from the second device, data generated based on the output of the audio tone; and adjusting an audio timing synchronization setting of a third device based at least in part on the data received from the second device.

18. The electronic device of claim 1, wherein the audio tone is outputted in accordance with the audio timing synchronization setting of the third device.

19. The electronic device of claim 1, wherein the output of the audio tone is detected at a microphone of the second device, and the data generated based on the output of the audio tone is generated based on the detected audio tone at the microphone of the second device.

20. The non-transitory computer-readable storage medium of claim 16, the one or more programs further including instructions for:
subsequent to causing the output of the audio tone:
in accordance with a determination that a set of criteria indicating that the second device did not detect the audio tone is met, repeating output of the audio tone.

21. The non-transitory computer-readable storage medium of claim 20, wherein the set of criteria includes a criterion that is met when a first user input is received, at the electronic device, representing a request to repeat output of the audio tone.

22. The non-transitory computer-readable storage medium of claim 20, wherein the set of criteria includes a criterion that is met when a second user input is received, at the second device, representing a request to repeat output of the audio tone.

23. The non-transitory computer-readable storage medium of claim 16, wherein the third device is different than the electronic device and different than the second device.

24. The non-transitory computer-readable storage medium of claim 16, wherein adjusting the audio timing synchronization setting of the third device comprises:
transmitting, via the communication device, adjusted audio timing synchronization data to the third device.

25. The non-transitory computer-readable storage medium of claim 16, the one or more programs further including instructions for:
determining a value representing a time delay between a first timestamp corresponding to an output time of the audio tone and a second timestamp corresponding to a time of detection by the second device of the outputted audio tone.

26. The non-transitory computer-readable storage medium of claim 16, wherein the electronic device is connected to a display device, the one or more programs further including instructions for:
while causing output of the audio tone, causing display, via the display device, of a graphical indication that the audio tone is being output.

27. The non-transitory computer-readable storage medium of claim 16, wherein transmitting the request for the second device to participate in the audio timing synchronization process comprises:
transmitting, via the communication device, to a fourth device a second request for the fourth device to participate in the audio timing synchronization process.

28. The non-transitory computer-readable storage medium of claim 16, the one or more programs further including instructions for:
receiving data representing a first user input, wherein at least a portion of the audio timing synchronization process is performed in response to receiving the data representing the first user input.

29. The non-transitory computer-readable storage medium of claim 28, wherein the request for the second device to participate in the audio timing synchronization process is transmitted in response to receiving the data representing the first user input.

30. The non-transitory computer-readable storage medium of claim 28, wherein the output of the audio tone is caused in response to receiving the data representing the first user input.

31. The non-transitory computer-readable storage medium of claim 28, wherein the first user input is received at the electronic device.

32. The non-transitory computer-readable storage medium of claim 28, wherein the first user input is received at the second device.

33. The non-transitory computer-readable storage medium of claim 16, the one or more programs further including instructions for:
while performing a process for configuring a plurality of settings of the electronic device, automatically performing the audio timing synchronization process.

34. The non-transitory computer-readable storage medium of claim 16, wherein the audio tone is outputted in accordance with the audio timing synchronization setting of the third device.

35. The non-transitory computer-readable storage medium of claim 16, wherein the output of the audio tone is detected at a microphone of the second device, and the data generated based on the output of the audio tone is generated based on the detected audio tone at the microphone of the second device.

36. The computer-implemented method of claim 17, further comprising:
subsequent to causing the output of the audio tone:
in accordance with a determination that a set of criteria indicating that the second device did not detect the audio tone is met, repeating output of the audio tone.

37. The computer-implemented method of claim 36, wherein the set of criteria includes a criterion that is met when a first user input is received, at the electronic device, representing a request to repeat output of the audio tone.

38. The computer-implemented method of claim 36, wherein the set of criteria includes a criterion that is met when a second user input is received, at the second device, representing a request to repeat output of the audio tone.

39. The computer-implemented method of claim 17, wherein the third device is different than the electronic device and different than the second device.

40. The computer-implemented method of claim 17, wherein adjusting the audio timing synchronization setting of the third device comprises:
 transmitting, via the communication device, adjusted audio timing synchronization data to the third device.

41. The computer-implemented method of claim 17, further comprising:
 determining a value representing a time delay between a first timestamp corresponding to an output time of the audio tone and a second timestamp corresponding to a time of detection by the second device of the outputted audio tone.

42. The computer-implemented method of claim 17, wherein the electronic device is connected to a display device, the computer-implemented method further comprising:
 while causing output of the audio tone, causing display, via the display device, of a graphical indication that the audio tone is being output.

43. The computer-implemented method of claim 17, wherein transmitting the request for the second device to participate in the audio timing synchronization process comprises:
 transmitting, via the communication device, to a fourth device a second request for the fourth device to participate in the audio timing synchronization process.

44. The computer-implemented method of claim 17, further comprising:
 receiving data representing a first user input, wherein at least a portion of the audio timing synchronization process is performed in response to receiving the data representing the first user input.

45. The computer-implemented method of claim 44, wherein the request for the second device to participate in the audio timing synchronization process is transmitted in response to receiving the data representing the first user input.

46. The computer-implemented method of claim 44, wherein the output of the audio tone is caused in response to receiving the data representing the first user input.

47. The computer-implemented method of claim 44, wherein the first user input is received at the electronic device.

48. The computer-implemented method of claim 44, wherein the first user input is received at the second device.

49. The computer-implemented method of claim 17, further comprising:
 while performing a process for configuring a plurality of settings of the electronic device, automatically performing the audio timing synchronization process.

50. The computer-implemented method of claim 17, wherein the audio tone is outputted in accordance with the audio timing synchronization setting of the third device.

51. The computer-implemented method of claim 17, wherein the output of the audio tone is detected at a microphone of the second device, and the data generated based on the output of the audio tone is generated based on the detected audio tone at the microphone of the second device.

* * * * *